US008347207B2

(12) United States Patent
Borgsmidt et al.

(10) Patent No.: US 8,347,207 B2
(45) Date of Patent: Jan. 1, 2013

(54) AUTOMATICALLY MOVING ANNOTATIONS ASSOCIATED WITH MULTIDIMENSIONAL DATA BETWEEN LIVE DATACUBES

(75) Inventors: Rasmus Borgsmidt, Luxembourg (LU); Finuala Tarnoff, Hampshire (GB); Bindhu Mary Cherian, Shakopee, MN (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/954,415

(22) Filed: Dec. 12, 2007

(65) Prior Publication Data
US 2009/0024660 A1 Jan. 22, 2009

Related U.S. Application Data

(60) Provisional application No. 60/950,058, filed on Jul. 16, 2007.

(51) Int. Cl.
*G06N 3/00* (2006.01)
(52) U.S. Cl. ........................................ 715/231
(58) Field of Classification Search ............ 715/231, 715/234, 243, 254, 255
See application file for complete search history.

(56) References Cited

U.S. PATENT DOCUMENTS

| 4,878,175 | A | 10/1989 | Norden-Paul et al. |
| 5,247,611 | A | 9/1993 | Norden-Paul et al. |
| 5,325,478 | A | 6/1994 | Shelton et al. |
| 5,546,580 | A | 8/1996 | Seliger et al. |
| 5,546,680 | A | 8/1996 | Barma et al. |
| 5,590,259 | A | 12/1996 | Anderson et al. |
| 5,701,423 | A | 12/1997 | Crozier |
| 5,899,998 | A | 5/1999 | McGauley et al. |
| 6,167,405 | A | 12/2000 | Rosensteel, Jr. et al. |
| 6,496,913 | B1 | 12/2002 | Taugher et al. |
| 6,546,095 | B1 | 4/2003 | Iverson et al. |
| 6,944,821 | B1 * | 9/2005 | Bates et al. ................... 715/209 |
| 7,043,497 | B1 | 5/2006 | Carty et al. |
| 7,082,427 | B1 | 7/2006 | Seibel et al. |
| 7,191,183 | B1 | 3/2007 | Goldstein |

(Continued)

FOREIGN PATENT DOCUMENTS
EP 0 501 180 A2 9/1992
(Continued)

OTHER PUBLICATIONS

XML Inclusions (XInclude) Version 1.0, Dec. 20, 2004, W3C, <http://222.23.org/TR/2004/REC-xinclude-20041220/>, pp. 1-20.*

(Continued)

*Primary Examiner* — Kyle Stork
(74) *Attorney, Agent, or Firm* — Shumaker & Sieffert, P.A.

(57) ABSTRACT

Techniques are described for sharing multidimensional data and associated annotations between software systems. As described herein, the techniques provide mechanisms for defining inter-application "links" for automatically copying data and associated annotations among databases associated with the enterprise software systems. For example, a system may include a first database storing multidimensional data for a first software application, and a second database storing multidimensional data for a second software application. The system further includes an interface by which an administrator defines a link that specifies a source area of the first database and a target area of the second database. A link control module automatically moves multidimensional data and annotations associated with cells or cubes of the multidimensional data from the source area to the target area in accordance with the link.

24 Claims, 29 Drawing Sheets

U.S. PATENT DOCUMENTS

| | | | |
|---|---|---|---|
| 7,197,502 | B2 | 3/2007 | Feinsmith |
| 7,233,952 | B1* | 6/2007 | Chen .................................. 1/1 |
| 7,266,540 | B2 | 9/2007 | Chung et al. |
| 7,536,713 | B1* | 5/2009 | Bartholomew .................. 726/7 |
| 2004/0107255 | A1* | 6/2004 | Ludwig et al. ............... 709/204 |
| 2004/0162836 | A1 | 8/2004 | Aronoff et al. |
| 2005/0278458 | A1* | 12/2005 | Berger et al. ................ 709/248 |
| 2006/0022048 | A1 | 2/2006 | Johnson |
| 2006/0112153 | A1 | 5/2006 | Bowen |
| 2006/0112390 | A1 | 5/2006 | Hamaoka |
| 2006/0230025 | A1 | 10/2006 | Baelen |
| 2006/0230067 | A1 | 10/2006 | Tarnoff et al. |
| 2007/0027904 | A1 | 2/2007 | Chow et al. |
| 2008/0046481 | A1 | 2/2008 | Gould et al. |
| 2008/0249761 | A1 | 10/2008 | Easterly |
| 2008/0301155 | A1 | 12/2008 | Borgsmidt |

FOREIGN PATENT DOCUMENTS

| | | |
|---|---|---|
| WO | WO 84/00426 | 2/1984 |
| WO | WO 00/42530 | 7/2000 |

OTHER PUBLICATIONS

Sanjay Goil and Alok Choudhary, "An Infrastructure for Scalable Parallel Multidimensional Analysis," *Scientific and Statistical Database Management, Eleventh International Conference, IEEE Comput. Soc*, US, Jul. 28, 1999 (pp. 102-111).

Joe Guerra, "Using Microsoft SQL Server Data Transformation Services with IBM Databases," dated Nov. 2002; Internet Article retrieved from URL:http://www.microsoft.com/sql/evaluation/compare/ibm/UsingMSSS-DTSwIBM-DBs.pdf (retrieved on Jul. 27, 2006) pp. 1-19.

U.S. Appl. No. 11/950,257, filed Dec. 4, 2007, entitled "Data Entry Commentary and Sheet Reconstruction for Multidimensional Enterprise System."

U.S. Appl. No. 11/900,895, filed Sep. 13, 2007, entitled "Job Scheduling For Automatic Movement of Multidimensional Data Between Live Datacubes."

Office Action from U.S. Appl. No. 11/103,902, dated Aug. 9, 2007, 16 pp.

Response to Office Action dated Aug. 9, 2007, from U.S. Appl. No. 11/103,902, filed Nov. 9, 2007, 14 pp.

Office Action from U.S. Appl. No. 11/103,902, dated Jan. 25, 2008, 17 pp.

Request for Continued Examination for U.S. Appl. No. 11/103,902, filed Jun. 25, 2008, 12 pp.

Office Action from U.S. Appl. No. 11/103,902, dated Oct. 3, 2008, 16 pp.

Response to Office Action dated Oct. 3, 2008, from U.S. Appl. No. 11/103,902, filed Jan. 5, 2009, 9 pp.

Office Action from U.S. Appl. No. 11/103,902, dated Mar. 26, 2009, 15 pp.

Pre-Appeal Brief Request for Review for U.S. Appl. No. 11/103,902, filed Jun. 25, 2009, 6 pp.

Appeal Brief for U.S. Appl. No. 11/103,902, filed Aug. 19, 2009, 19 pp.

Examiner's Answer to Appeal Brief filed Aug. 19, 2009, for U.S. Appl. No. 11/103,902, dated Oct. 26, 2009, 17 pp.

Office Action from U.S. Appl. No. 11/900,895, dated Dec. 1, 2009, 26 pp.

Response to Office Action dated Dec. 1, 2009, from U.S. Appl. No. 11/900,985, filed Mar. 1, 2010, 16 pp.

Office Action from U.S. Appl. No. 11/900,985, dated May 28, 2010, 30 pp.

Request for Continued Examination for U.S. Appl. No. 11/900,985, filed Aug. 27, 2010, 17 pp.

Notice of Allowance from U.S. Appl. No. 11/900,895, dated Sep. 20, 2010, 8 pp.

Office Action from U.S. Appl. No. 11/950,257, dated Feb. 1, 2010, 16 pp.

Response to Office Action dated Feb. 1, 2010, from U.S. Appl. No. 11/950,257, filed Apr. 29, 2010, 12 pp.

Office Action from U.S. Appl. No. 11/950,257, dated Jul. 21, 2010, 17 pp.

Pre-Appeal Brief Request for Review for U.S. Appl. No. 11/950,257, filed Oct. 19, 2010, 6 pp.

Appeal Brief for U.S. Appl. No. 11/950,257, filed Jan. 14, 2011, 26 pp.

Examiner's Answer to Appeal Brief filed Jan. 14, 2011, from U.S. Appl. No. 11/950,257, dated Mar. 25, 2011, 23 pp.

* cited by examiner

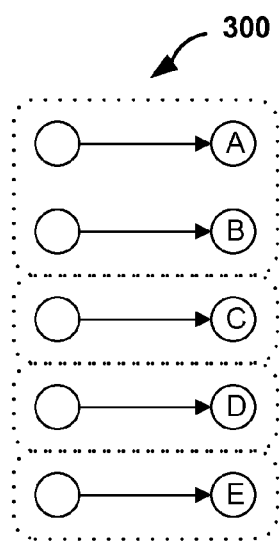 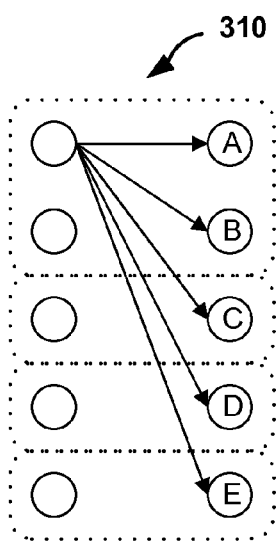 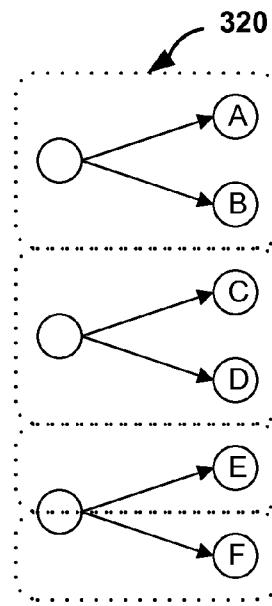
FIG. 20A    FIG. 20B    FIG. 20C
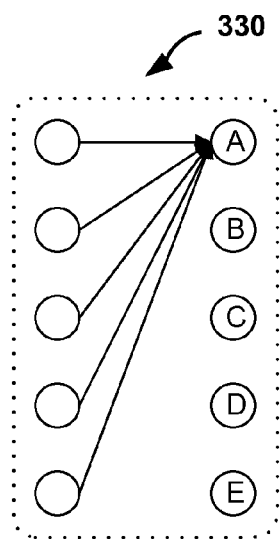 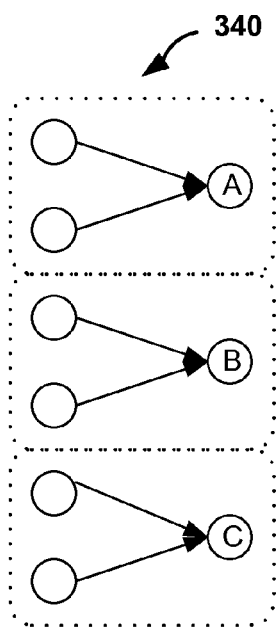 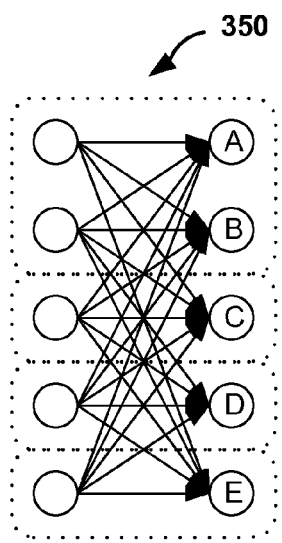
FIG. 20D    FIG. 20E    FIG. 20F

AUTOMATICALLY MOVING ANNOTATIONS ASSOCIATED WITH MULTIDIMENSIONAL DATA BETWEEN LIVE DATACUBES

This application claims the benefit of U.S. Provisional Application Ser. No. 60/950,058, filed Jul. 16, 2007, the entire content of which is incorporated herein by reference.

TECHNICAL FIELD

The invention relates to software systems and, in particular, enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems and other enterprise software systems.

In many situations, an enterprise may maintain multiple enterprise software systems. The enterprise software systems typically create and maintain separate multidimensional databases to collect and manage information to support the business processes. Each of the enterprise software systems is "current" from the perspective of their respective users. An enterprise often desires to share data between the different enterprise software systems. As one example, the user may wish to move multi-dimensional data from a financial planning system to a reporting system.

One conventional technique for moving the multidimensional data is to export the multidimensional data from one enterprise software system to the second enterprise software system. During this process, it is often required to "freeze" or "lock down" the first entire enterprise software system in order to export consistent data. As one example, some software systems must be brought offline before any export can be initiated to prevent any updates or data changes during the export process. During this process, users of the first enterprise software system are prevented from accessing and utilizing the software system.

Moreover, the multidimensional data often must be exported to an offline "staging area" of the second enterprise planning system. The staging area acts a temporary holding area while the multidimensional data can be processed and merged into the second enterprise planning system. As a result, conventional techniques for sharing data between enterprise software systems are often cumbersome and time-consuming.

SUMMARY

Techniques are described for sharing multidimensional data and associated annotations between software systems. As described herein, the techniques provide mechanisms for defining inter-application "links" for automatically moving (i.e., copying) data and associated annotations among databases associated with the enterprise software systems. For example, a system may include a first database storing multidimensional data for a first software application, and a second database storing multidimensional data for a second software application. The system further includes an interface by which an administrator defines a link that specifies a source area of the first database and a target area of the second database. A link control module automatically moves multidimensional data and annotations associated with cells or cubes of the multidimensional data from the source area to the target area in accordance with the link.

As used herein, the term "link" generally refers to a software element (e.g., control information) that maps multidimensional data from one data source to another data source. For example, a link may map multidimensional data from one or more source enterprise software systems to one or more destination enterprise software systems. As another example, a link may map multidimensional data between multiple databases of a single enterprise software application. In addition to specifying the source and destination databases, each link provides a link definition that controls any data transformations to be applied when copying the multidimensional data. In this manner, the links control the mapping and synchronization of the multidimensional data, including control of past and future time versioning and dimensionality of the shared data.

In general, the links may be activated manually or embedded within macros to run at specific times or in response to certain events. Macros can be chained together, allowing links to be defined for copying data between multiple databases in a sequence.

Multiple levels of granularity are supported by different forms of links. For example, administrative links may be defined to move larger data sets associated with multiple users. In addition, user-controlled links may be defined on a per-node basis to move data associated with a node in a hierarchical model.

In one embodiment, a system comprises a first database storing multidimensional data for a first software application, and a second database storing multidimensional data for a second software application. The system further includes an interface by which an administrator defines a link that specifies a source area of the first database and a target area of the second database. A link control module automatically moves multidimensional data from the source area to the target area in accordance with the link and automatically moves annotations associated with the multidimensional data from the source area to the target area in accordance with the link. The annotations define at least text-based commentary associated with the multidimensional data.

In another embodiment, a method comprises defining a link from a first software application to a second software application, wherein the link specifies a source area of a multidimensional database associated with the first software application and a target area of a multidimensional database associated with the second software application. The method further comprises automatically copying multidimensional data from the source area to the target area in accordance with the link. In addition, the method comprises automatically copying annotations associated with the multidimensional data from the source area to the target area in accordance with the link. The annotations define at least text-based commentary associated with the multidimensional data.

In another embodiment, a computer-readable medium comprises instructions to cause a processor to present a user interface to receive input specifying a first software application, a second software application, a source data cube associated with the first software application, a source dimension of the source data cube, at least one item along the source dimension, a target data cube associated with the second software application, a target dimension of the target data cube, and at least one target item of the target dimension. The instructions further cause the processor to automatically move multidimensional data associated with the source items of the source data cube to the target items of the target data cube. The instructions also cause the programmable processor to automatically move annotations associated with the multidimensional data from the source area to the target area in accordance with the link. The annotations define at least text-based commentary associated with the multidimensional data. The annotations define at least text-based commentary associated with the multidimensional data.

The invention may provide one or more advantages. For example, in some embodiments, the techniques may be used to automatically move multidimensional data and associated annotations between enterprise software systems while the software systems remain active. As a result, users of the respective enterprise software systems may continue to interact with the systems.

In addition, the techniques may allow an enterprise to utilize an efficient set of enterprise databases that are architected with the appropriate size and dimensionality for the associated business processes. As a result, the enterprise need not utilize a single, monolithic database that stores all of the multidimensional data for the enterprise.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 20A through 20F are block diagrams illustrating example mappings from source items to target items.

FIG. 21 is a screen illustration of a user interface for viewing and entering planning data.

FIG. 23 is a screen illustration of a user interface for viewing and entering planning data that displays an annotation for a cell of planning data.

DETAILED DESCRIPTION

Figure 1:
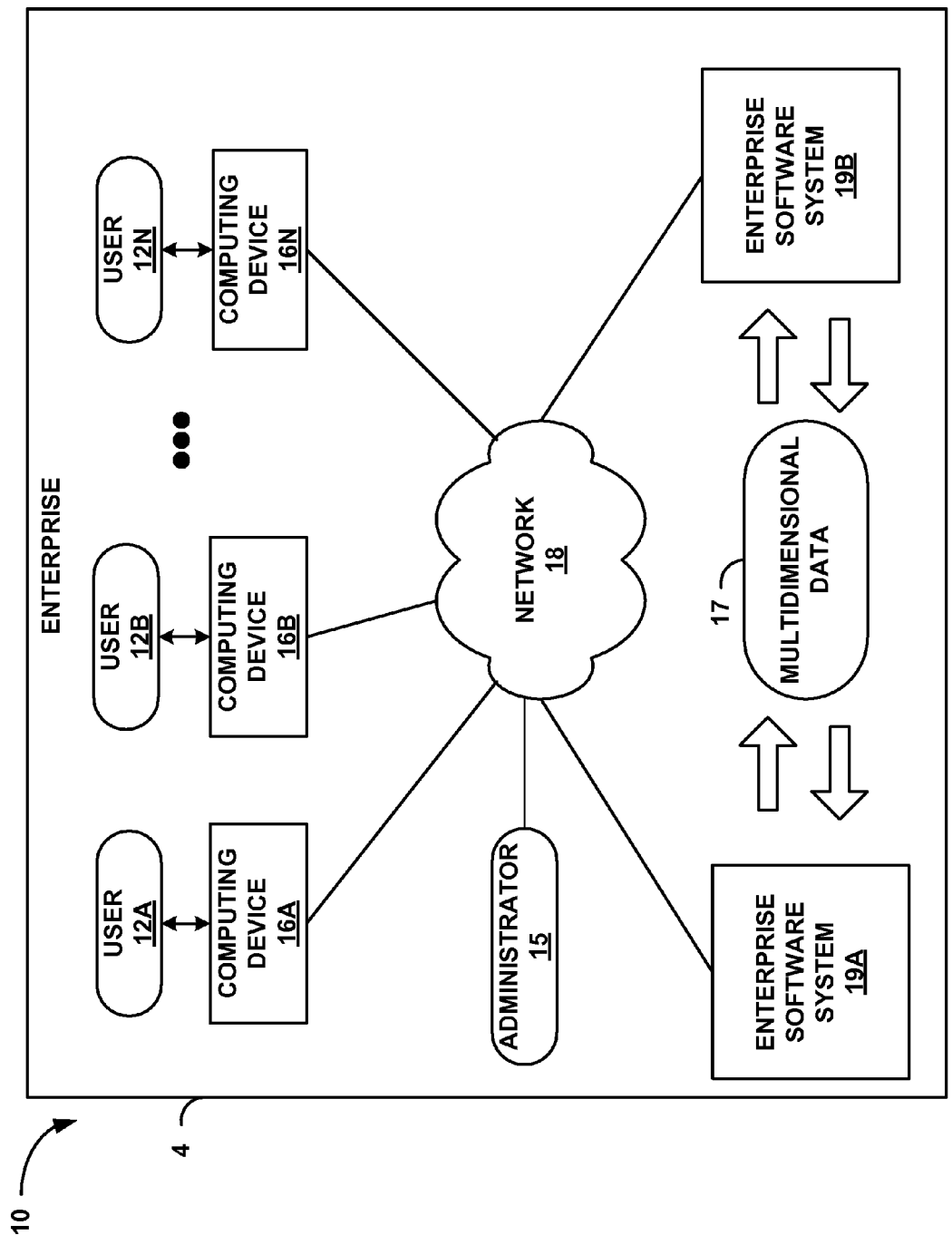
FIG. 1 is a block diagram illustrating an example computing environment in which users interact with a plurality of enterprise software systems.

FIG. 1 is a block diagram illustrating an example computing environment 10 in which a plurality of users 12A-12N (collectively, "users 12") interact with a plurality of enterprise software systems 19A and 19B (collectively "enterprise software systems 19"). In the system shown in FIG. 1, enterprise software systems 19 are communicatively coupled to a number of computing devices 16A-16E (collectively, "computing devices 16") by a network 18.

Enterprise users 12 may use a variety of computing devices 16 to interact with enterprise software systems 19 via network 18. For example, an enterprise user 12 may interact with enterprise software systems 19 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, computing environment 10 can readily scale to suit large enterprises. Enterprise users 12 may directly access enterprise software systems 19 via a local area network, or may remotely access enterprise software systems 19 via a virtual private network, remote dial-up, or similar remote access communication mechanism.

In general, enterprise software systems 19 may be any type of enterprise software system that utilizes multidimensional data. For example, the techniques described herein may be readily applied to order management systems, inventory management systems, sales force management systems, business intelligence tools, enterprise reporting tools, project and resource management systems and other enterprise software systems.

For exemplary purposes, the invention is described in reference to an enterprise planning system, such as an enterprise financial or budget planning system. In particular, it is assumed that enterprise software system 19A represents a large-scale, web-based enterprise planning system. Enterprise software system 19B may also represent an enterprise planning system for planning other business processes. Alternatively, enterprise software system 19B may be any other type of enterprise software system.

In this example, enterprise software system 19A enables and automates the reconciliation of top-down targets with detailed bottom-up forecasts for an enterprise. Enterprise software system 19A implements and manages an enterprise planning process, which generally consists of three functions: (1) modeling, (2) contribution and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts then specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users 12 to each node, such as managers, supervisors, sales representatives, lab managers, or the like, that are responsible for enterprise planning for the cost center corresponding to the node. Each enterprise user 12 may be designated as a contributor that provides planning data to enterprise software system 19A, a reviewer that accepts or rejects contributions from the contributors, or both. The contributors and reviewers may be authorized users within the enterprise or within other entities coupled to network 18, such as suppliers or customers.

The enterprise users 12 that are designated as contributors interact with enterprise software system 19A to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise software system 19A automates the reconciliation of the forecast data with the corporate target data provided by the analysts. In particular, enterprise software system 19A operates in accordance with a defined model, i.e., the enterprise planning model created by the analysts, to provide a hierarchical planning process having multiple reconciliation levels. As each of the contributors provides his or her contribution data (referred to generally, as "enterprise data"), enterprise software system 19A automatically aggregates the contribution data across the enterprise in real-time, and provides access to the aggregated data to enterprise users 12 designated as reviewers associated with higher levels of the enterprise. In particular, upon receiving contribution data from the contributors, enterprise software system 19A identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise software system 19A ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise software system 19A may provide more accurate enterprise planning than with conventional techniques. For example, enterprise software system 19A may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise software system 19A can aggregate contribution data in real-time, all users 12 can be presented with an accurate, up-to-date view of the numbers. Further, the architecture of enterprise software system 19A can readily scale to thousands of users, and may be designed around best planning practices. In addition, the techniques enabling high participation by enterprise users 12, i.e., the contributors and reviewers, allowing accurate planning cycles to be reduced.

Enterprise software system 19A may utilize a "cut-down" process by which the multidimensional data store is "sliced" for each user 12 in accordance with the defined enterprise model. During this process, enterprise software system 19A identifies areas of the defined model to which users 12 are assigned, either as contributors or reviewers, and "slices" the data store based on the assignments. When a given user 12 logs in and proceeds with an enterprise planning activity, enterprise software system 19A communicates the respective data slice to the respective computing device 16 for display to the user via the extended spreadsheet application. In this fashion, enterprise software system 19A need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, enterprise software systems 19 provides interfaces by which administrator 15 defines "links" for automatically moving (copying) multidimensional data 17 between the enterprise software systems. As used herein, the term "link" generally refers to software element that maps data from one or more source enterprise software systems to one or more destination software systems. In this example, administrator 15 may define links for moving multidimensional data 17 from enterprise software system 19A to enterprise software system 19B. Similarly, administrator 15 may define links for moving multidimensional data 17 from enterprise software system 19B to enterprise software system 19A. Although illustrated for exemplary purposes as moving multidimensional data 17 from a single source enterprise software system to a single destination, the techniques described herein may readily be applied to move multidimensional data from one or more source enterprise software systems to one or more destination systems.

In addition to specifying the source and destination databases, administrator 15 may configure each link to specify one or more data transformations to be automatically applied when moving multidimensional data 17. In this manner, administrator 15 may define the links to control the mapping and synchronization of multidimensional data 17 between enterprise software systems 19, including control of past and future time versioning and dimensionality as the data is stored in each of the enterprise software systems.

In general, the links may be activated manually or automatically. For example, administrator 15 may interact with enterprise software systems 19 to define macros for automatically invoking the links at specific times or in response to certain events. Moreover, administrator 15 may chain together the macros, thereby defining an automated sequence of links for moving data between multiple databases.

As described in further detail below, enterprise software systems 19 allow administrator 15 to define the links with various levels of granularity. For example, administrator 15 may define a set of "administrative links" for moving larger data sets associated with multiple users 12. An administrative link, for example, may be defined to map one or more source items to one or more different target items. As used in this disclosure, the term "item" refers to a label for a set of data along a dimension of a multidimensional dataset. For example, a multidimensional dataset may have two dimensions: a "product" dimension and a "manufacturer" dimension. In this example, "items" along the "product" dimension may include "drills", "hammers", and "saws." Items along the "manufacturer" dimension may include "Acme", "Best", and "Top Tools". In this example, data cells in the multidimensional data may indicate the numbers of products in stock made by various manufacturers. For instance, a data cell in the multidimensional data at the "drills" item in the "product" dimension and at the "Acme" item in the "manufacturer" dimension may indicate the value "20". The data in this data cell thereby indicates that there are twenty Acme drills in stock.

The source items specified by an administrative link may be associated with the same or different source enterprise models. Similarly, the target items may be associated with the same or different target enterprise models. An administrative link that specifies movement of multidimensional data from a plurality of source models to a plurality of target models may be executed as a link job having multiple work elements.

In addition, administrator 15 may define "user links" on a per-node basis to move multidimensional data associated with one node of the organizational hierarchy from one data cube to another data cube, i.e., single source single target. Individual users 12 may invoke the user links to initiate movement of multidimensional data 17 that is specific to a slice of the enterprise model to which the user has access. Enterprise software system 19A may, for example, present a user interface by which any of users 12 can initiate automated movement and transformation of multidimensional data 17 related to data slices associated with nodes of the organizational hierarchy with which users 12 are associated.

Figure 2:
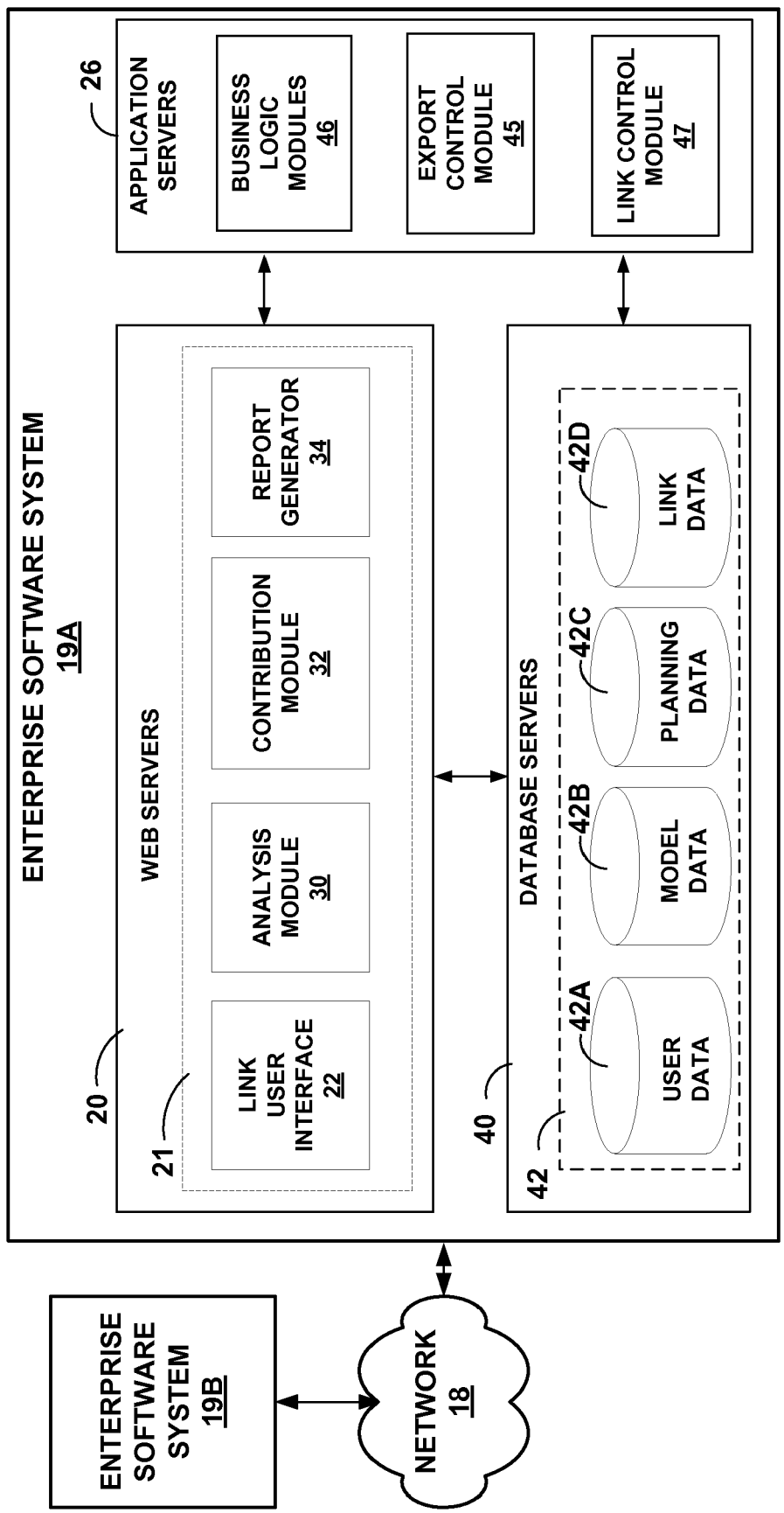
FIG. 2 is a block diagram illustrating one example embodiment of an enterprise software system in further detail.

FIG. 2 is a block diagram illustrating one embodiment of enterprise software system 19A in further detail. Again, for purposes of illustration, enterprise software system 19A is described in reference to an enterprise planning system, such as an enterprise financial or budget planning system. In the illustrated example, enterprise planning system 19A includes web servers 20, application servers 26 and database servers 40.

In general, web servers 20 provide an interface for communicating with users 12 via network 18. Web servers 20 execute web server software, such as Internet Information Server™ from Microsoft Corporation, of Redmond, Wash. As such, web servers 20 provide an environment for interacting with contributors, analysts, and reviewers according to software modules 21, which include link user interface 22, analysis module 30, contribution module 32, and report generator 34.

Software modules 21 typically take the form of instructions stored on computer-readable media for execution by one or more processors. Software modules 21 may comprise Visual Basic modules, Java scripts, Java Applets, Active Server Pages, web pages written in hypertext markup language (HTML) or dynamic HTML, Active X objects, documents conforming to the extensible markup language (XML) or other data description language, and other suitable modules. Web servers 20 serve up web pages defined by software modules 21, and communicate the web pages to computing devices of enterprise users 12. The web pages may include static media, such as text and graphic imagery, as well as conventional input media such as text entry boxes, radio buttons, drop-down menus, grids, spreadsheets and the like, for receiving information from enterprise users 12.

Software modules 21 interact with database servers 40 to access enterprise data 42 including user data 42A, model data 42B, planning data 42C and link data 42D. Enterprise data may be stored in a number of different forms including one or more data storage files, or one or more database management systems (DBMS) executing on one or more database servers. Furthermore, although illustrated separately, enterprise data 42 could be combined into a single database or other data storage structure. Enterprise data 42 could, for example, be implemented as a single relational database, such as SQL Server from Microsoft Corporation.

User data 42A reflects links to information for each of users 12, including the name, email address, and other contact information for the user. Model data 42B stores the enterprise planning models defined by analysts. For example, model database 42B stores information that defines the reconciliation process developed by the analysts, including the number of reconciliation levels, the various "nodes" in the hierarchy, and a contributor associated with each node. Planning data 42C stores the actual contribution data (i.e., "enterprise data") for each of the nodes for one or more planning sessions. Link data 42D stores data that defines links for automatically moving portions of multidimensional planning data 42C from enterprise software system 19A to enterprise software system 19B. In particular, link data 42D identifies and maps portions of planning data 42C to one or more multidimensional databases within enterprise software system 19B.

Referring again to software applications 21, link user interface 22 presents an interface with which administrator 15 interacts to define the links. In particular, administrator 15 interacts with link user interface 22 to specify a name and description for each link. In addition, administrator 15 may configure the link to define a data mapping by selecting source and target enterprise software applications, source and target multidimensional data cubes, and particular source and target dimensions. Moreover, administrator 15 may specify a mapping between individual items of the source and target dimensions, thereby controlling mapping and aggregation of the multidimensional data. Moreover, administrator 15 may interact with link user interface 22 to view status and execution information for each of the links.

Analysis module 30 includes one or more software modules for creating enterprise planning models, such as financial models for enterprise 4, to control the entire planning process. Contribution module 32 includes software modules for presenting a contribution interface for capturing contribution data from the contributors. Contribution module 32 captures and aggregates the contribution data across enterprise 4 in real-time, and provides access to the aggregated data to reviewers associated with higher levels of enterprise 4.

Report generator 34 includes analytical software modules that generate enterprise planning reports based on the contribution data received from the contributors and stored within planning data 42C. In particular, the analytical software modules allow users 12 to formulate complex queries for generating reports and performing other data analysis functions on the current data of the enterprise model. These software modules may be web-based modules having a browser interface, or may be stand-alone executable programs.

Business logic modules 46 execute within the operating environment provided by application servers 26 and provide functionality for accessing and processing the data stored within databases 42 in response to software modules 21. In particular, business logic modules 46 comprise software routines for implementing the enterprise planning functions, and are invoked by software modules 21.

Link control module 47 controls exportation and movement of portions of planning data 42C to one or more multidimensional databases within enterprise software system 19B in accordance with link data 42D. For example, link control module 47 may create one or more administrative jobs (link jobs) for automatically moving portions of planning data 42C in accordance with the link definitions maintained by link data 42D.

Figure 3:
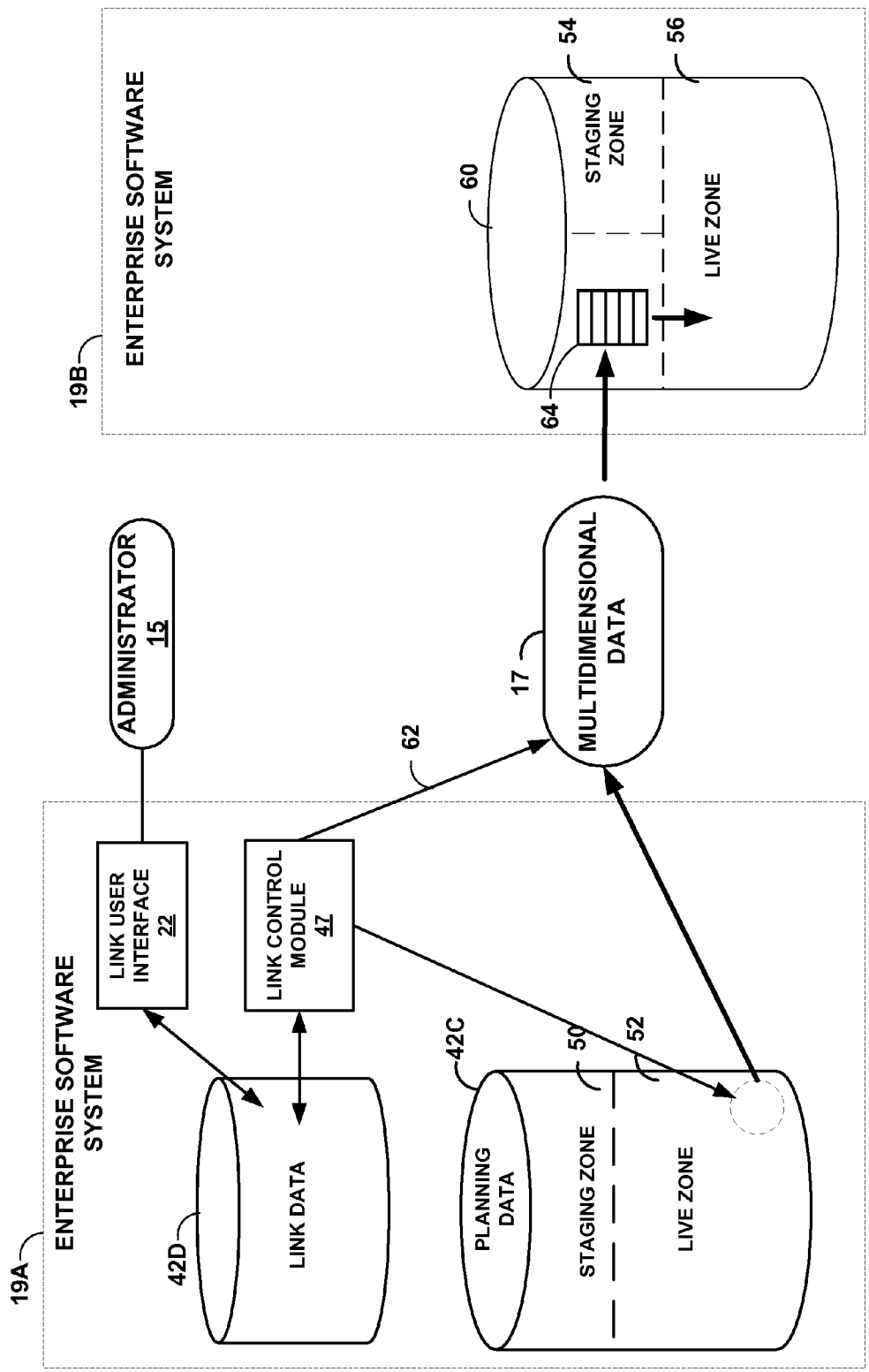
FIG. 3 is a block diagram illustrating an example multidimensional data transfer in further detail.

FIG. 3 is a block diagram illustrating an example multidimensional data transfer in further detail. In particular, FIG. 3 illustrates transfer of multidimensional data 17 from enterprise software system 19A to enterprise software system 19B in response to activation of an administrative link.

As illustrated in FIG. 3, planning data 42C includes a staging zone 50 and a "live zone" 52. In general, live zone 52 stores active planning data that is "current" from the perspective of users 12 of enterprise software system 19A. In contrast, staging zone 50 may be used as a temporary holding area where multidimensional data can be processed and merged into enterprise software system 19A. Similarly, enterprise software system 19B includes a database 60 having a staging zone 54 and a live zone 56.

In the example of FIG. 3, administrator 15 defines an administrative link to move multidimensional data 17 from live zone 52 of enterprise software system 19A to live zone 56 of enterprise software system 19B. For instance, link control module 47 may specify one or more work elements to read multidimensional data 17 from enterprise software system 19A and create one or more target data import blocks. These target data import blocks may contain the data to be copied from enterprise software system 19A (e.g., multidimensional data 17) to enterprise software system 19B. After creating a target data import block, link control module 47 may store the target data import block in import queue 64 of enterprise software system 19B. When a target data import block is stored in import queue 64, enterprise software system 19B directly imports the data in the target data import block into live zone 56 by processing the target data import block. In other words, link control module 47 may not need to perform any further processing on a target data import block after storing the target data import block in import queue 64. In this way, multidimensional data 17 may effectively bypass staging zone 54 of enterprise software system 19B.

Figure 4:
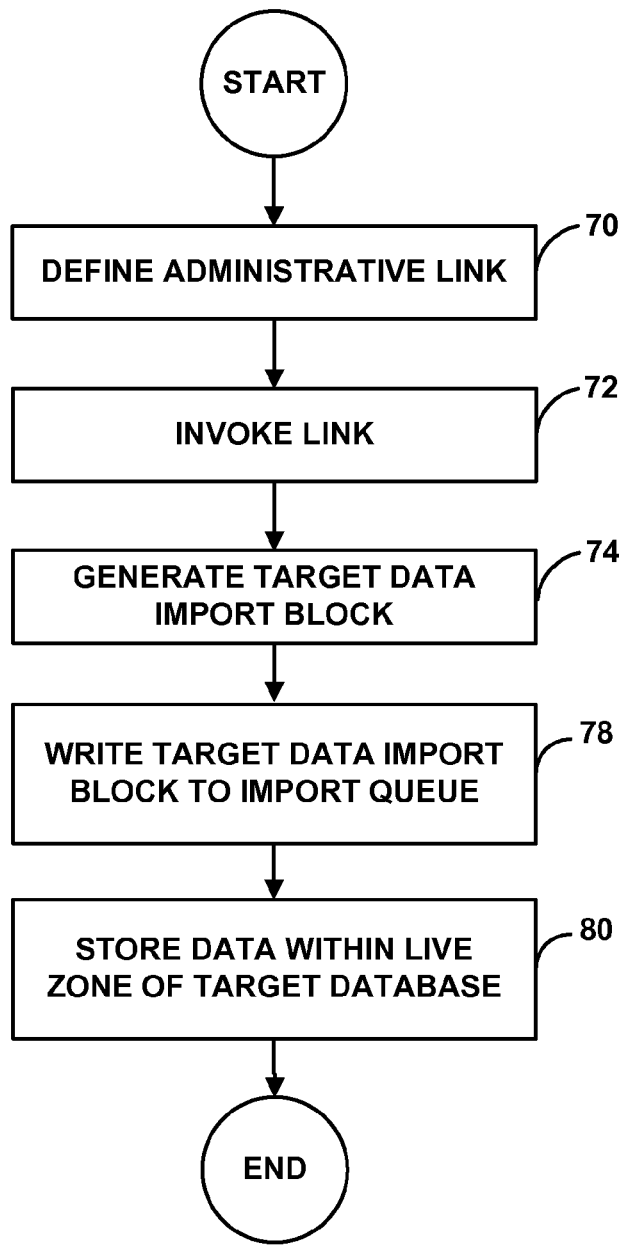
FIG. 4 is a flowchart illustrating exemplary operation of an enterprise software system.

FIG. 4 is a flowchart that describes exemplary operation of enterprise software system 19A with respect to the example of FIG. 3 in further detail. Initially, administrator 15 interacts with link user interface 22 to define an administrative link (70). As described, administrator 15 interacts with link user interface 22 to specify a name and description for each link. In addition, administrator 15 configures the link to define a data mapping from planning data 42C to database 60 as well as any transformations and aggregation to be applied to multidimensional data 17 during the move.

Next, link control module 47 invokes the link either in automated fashion in response to an internal or external system event or specified time period or in response to a manual request from administrator 15 (72). For instance, link control module 47 may access link data 42D to retrieve the link definition supplied by administrator 15. Link control module 47 may then initiate the execution of a number of work elements to generate a number of target data import blocks (74). The target data import blocks may be a consistent subset of planning data 42C. Furthermore, during the creation of the target data import blocks, one or more transformations may be performed on the subset of planning data 42C. For example, link control module 47 (or the created link job) may compute aggregate totals from source items of planning data 42C.

Once the target data import blocks have been created, link control module 47 stores the target data import block to import queue 64 (78). After link control module 47 writes stores the target data import block to import queue 64, enterprise software system 19B may store data in the data import block directly into live zone 56 in accordance with the dimensionality of database 60 (80). In this manner, enterprise software system 19B need not perform data manipulation or otherwise transform multidimensional data 17.

Figure 5:
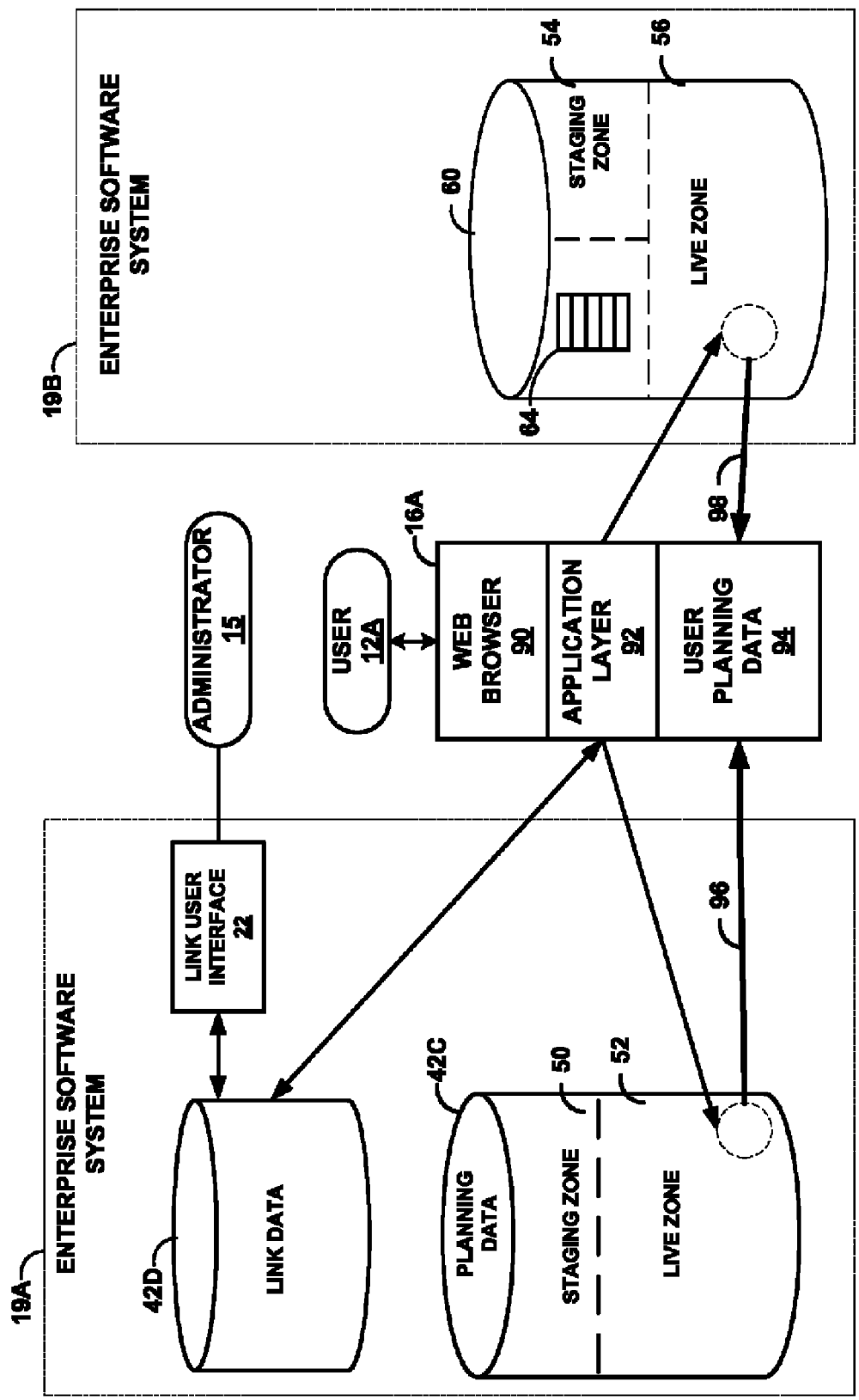
FIG. 5 is a block diagram illustrating another example of a multidimensional data transfer.

FIG. 5 is a block diagram illustrating another example of a multidimensional data transfer. In particular, FIG. 5 illustrates transfer of multidimensional data 17 from enterprise software system 19B to enterprise software system 19A in response to activation of a user link.

In the example of FIG. 5, administrator 15 interacts with link user interface 22 to define a user-controlled link. In particular, administrator 15 defines a user link that maps multidimensional data from live zone 56 of enterprise software system 19B to live zone 52 of enterprise software system 19A. However, administrator 15 defines the link as a "user link," thereby allowing users, such as user 12A, to manually activate the link for their respective portion of planning data 42C of the target system, i.e., enterprise software system 19A.

Initially, user 12A accesses enterprise software system 19A via computing device 16A. In this example, computing device is illustrated to include a web browser 90 or other user interface layer software. In addition, computing device 16A includes application layer 92 that represent business layer software for carrying out the planning process.

At the request of user 12A, application layer 92 retrieves personal planning data 96 for the user, i.e., the "slice" of the planning data 42C associated with the user. Application layer 92 downloads and stores the requested slice as user planning data 94. In addition, application layer 92 downloads the user link from link data 42D for which user 12A is authorized.

Next, user 12A manually invokes the user link, thereby directing application layer 92 to retrieve additional node-specific multidimensional data 98 from live zone 56 of enterprise software system 19B. Often, user 12A need not even know of the source database from which multidimensional data 98 was retrieved as administrator 15 defined and configured the user link. Application layer 92 performs a consistent read of multidimensional data 98 from live zone 56 and downloads multidimensional data 98. After downloading multidimensional data 98, application layer 92 generates a target data import block based on multidimensional data 98. When application layer 92 generates the target data import block, application layer 92 may perform transformations and mappings as specified by the user link. Next, application layer 92 may integrate the target data import block into user planning data 94.

When user 12A performs a save, application layer 92 then stores user planning data 94, including multidimensional data 98 retrieved from database 60, to planning data 42C.

Figure 6:
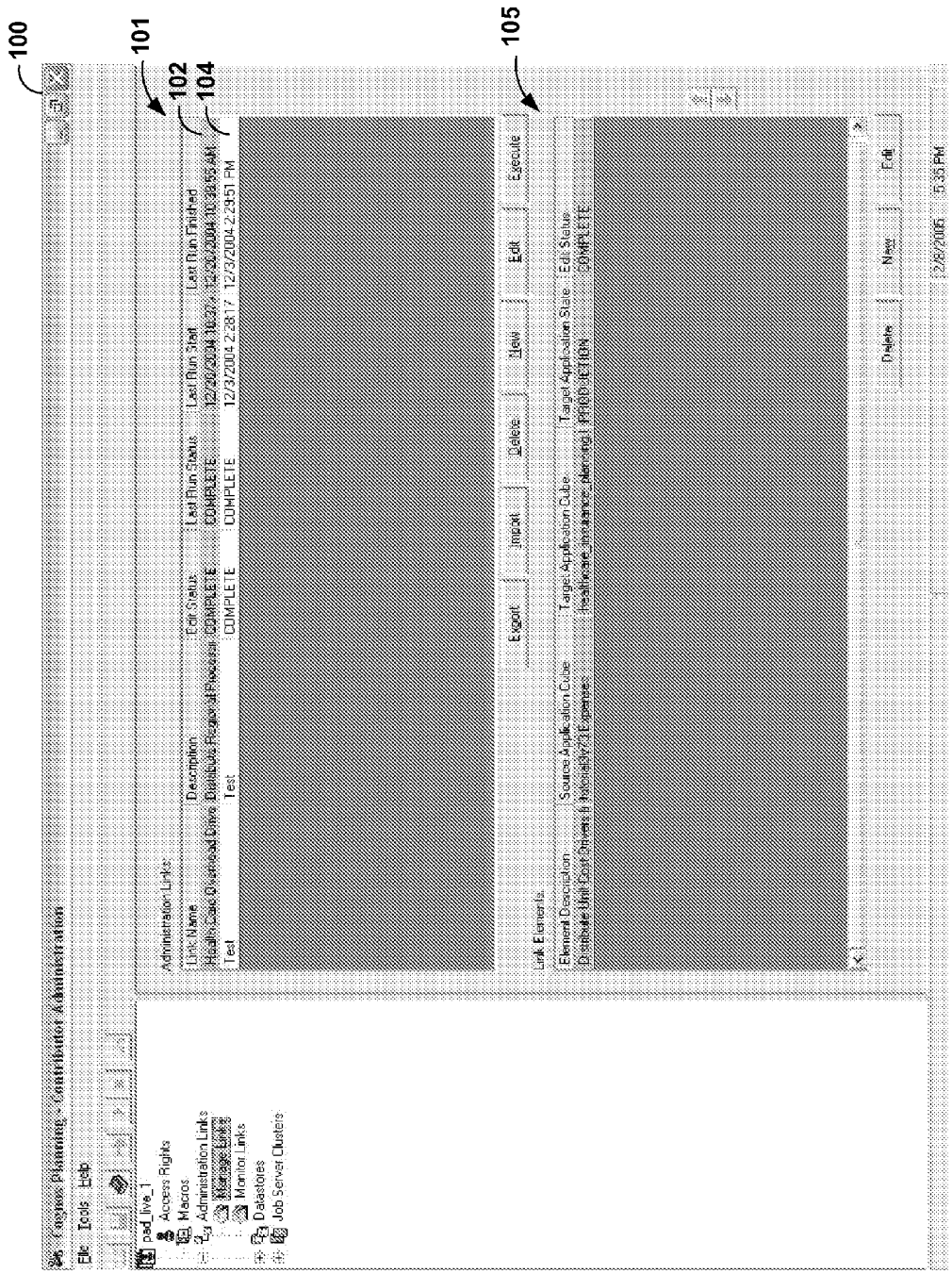
FIGS. 6-15 are exemplary screen illustrations of a user interface for defining, maintaining and monitoring enterprise software links described herein.

FIGS. 6-15 are exemplary screen illustrations presented by link user interface 22 for defining, maintaining and monitoring enterprise software links described herein. For example, FIG. 6 is a screen illustration of an example user interface 100 listing administrator links 102, 104. As illustrated, user interface 100 includes a display region 101 that lists a link name, description, edit status, last run status, an execution start time and an execution end time for each of links 102, 104. In addition, user interface 100 includes display region 105 that lists mapping information for a selected one of the links listed within display region 101. In this example, display region 105 presents mapping information for link 102, which is selected within display region 101. In particular, display region 105 lists a description of the elements associated with link 102, a source multidimensional cube, a target multidimensional cube and an edit status for the link.

Figure 7:
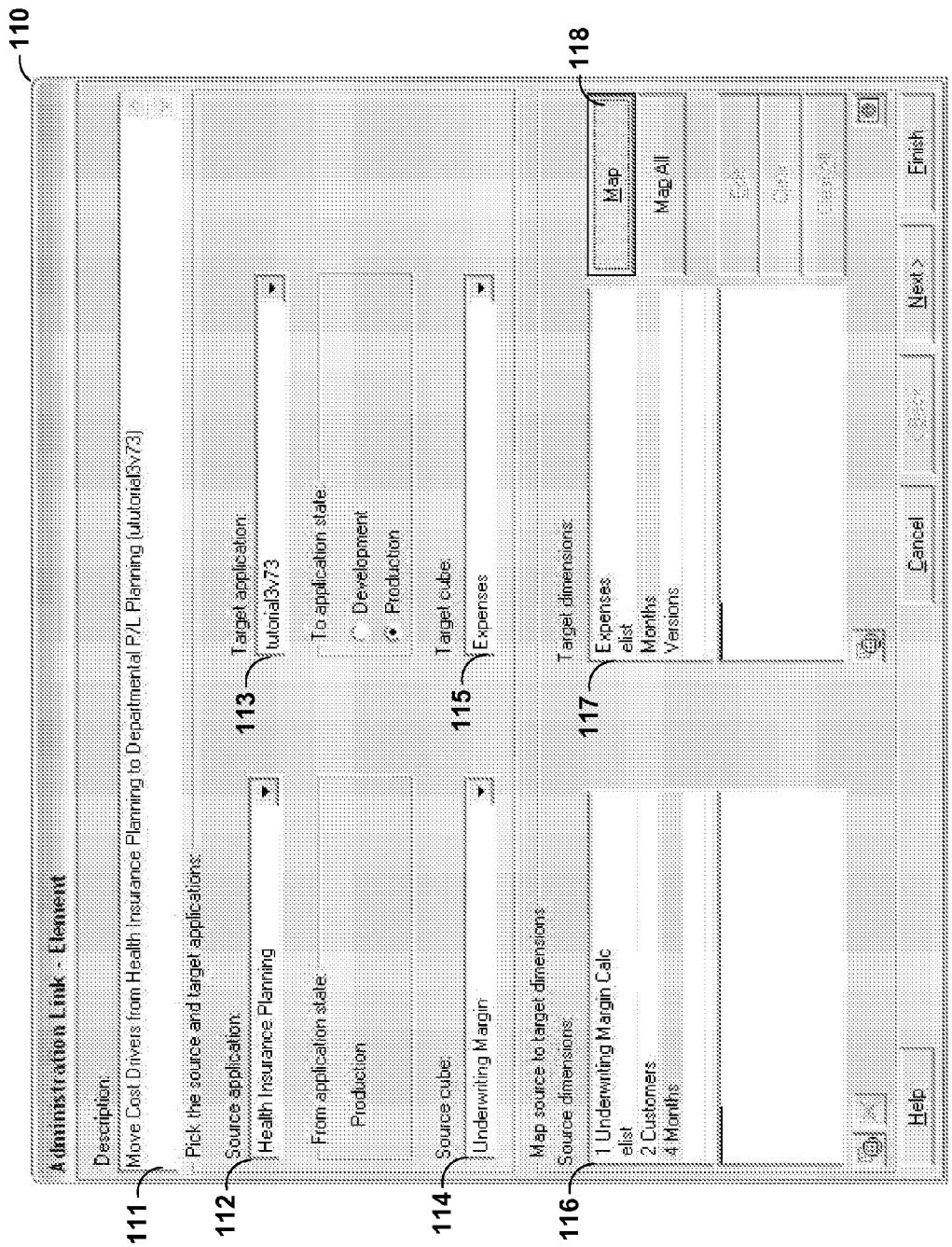
Figure 8:
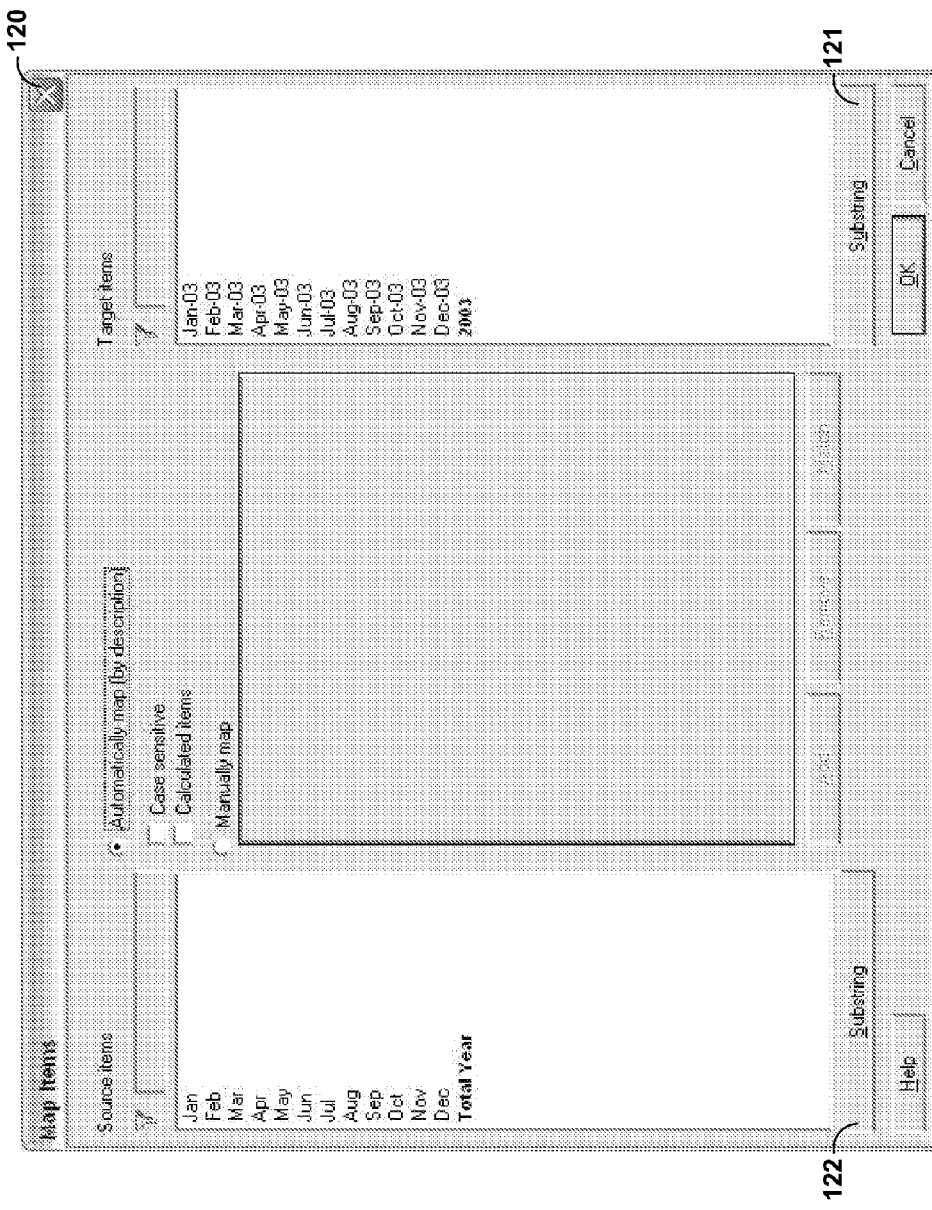

FIG. 7 is a screen illustration of an example user interface 110 with which administrator 15 interacts to create a new administrative link. In this example, user interface includes an input area 111 for receiving a description of link being created. In addition, input areas 112, 113 allow administrator 15 to select a source enterprise software application and a target enterprise software application, respectively.

User interface 110 further includes input areas 114, 115 for selection of a source data cube from the source software application and a target data cube for the target enterprise software application. For the selected cubes, input areas 116, 117 allow administrator 15 to map particular dimensions. Upon selecting map button 118, link user interface 22 presents user interface 120 (FIG. 8) that allows administrator 15 to map individual items from a source dimension to one or more items along a target dimension. In this example, administrator 15 maps items along a "4 months" source dimension to items along a "months" dimension of the target multidimensional cube.

Figure 9:
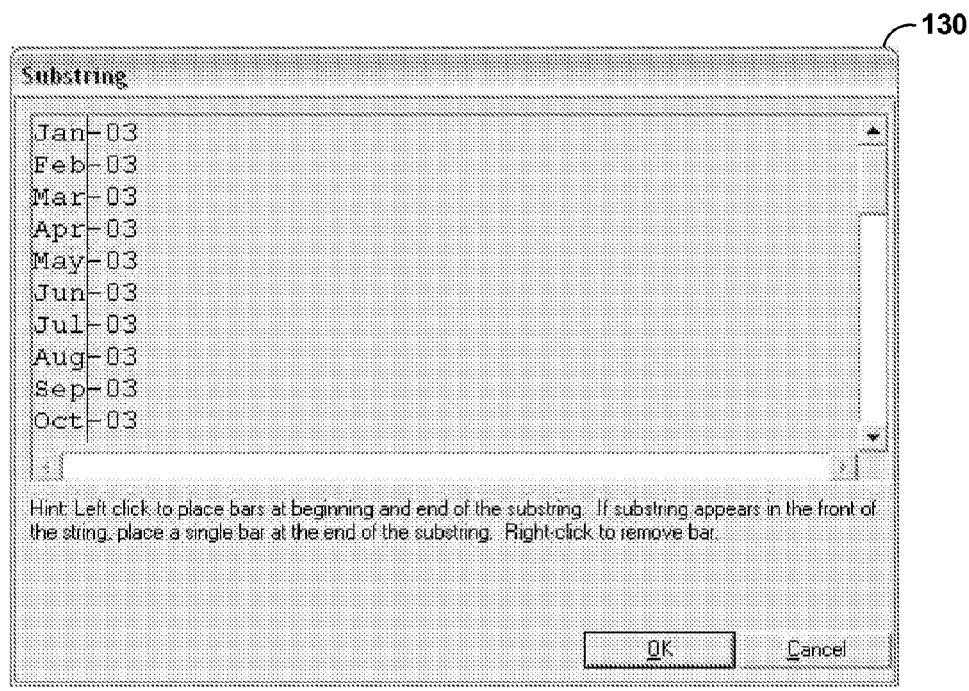
Figure 10:
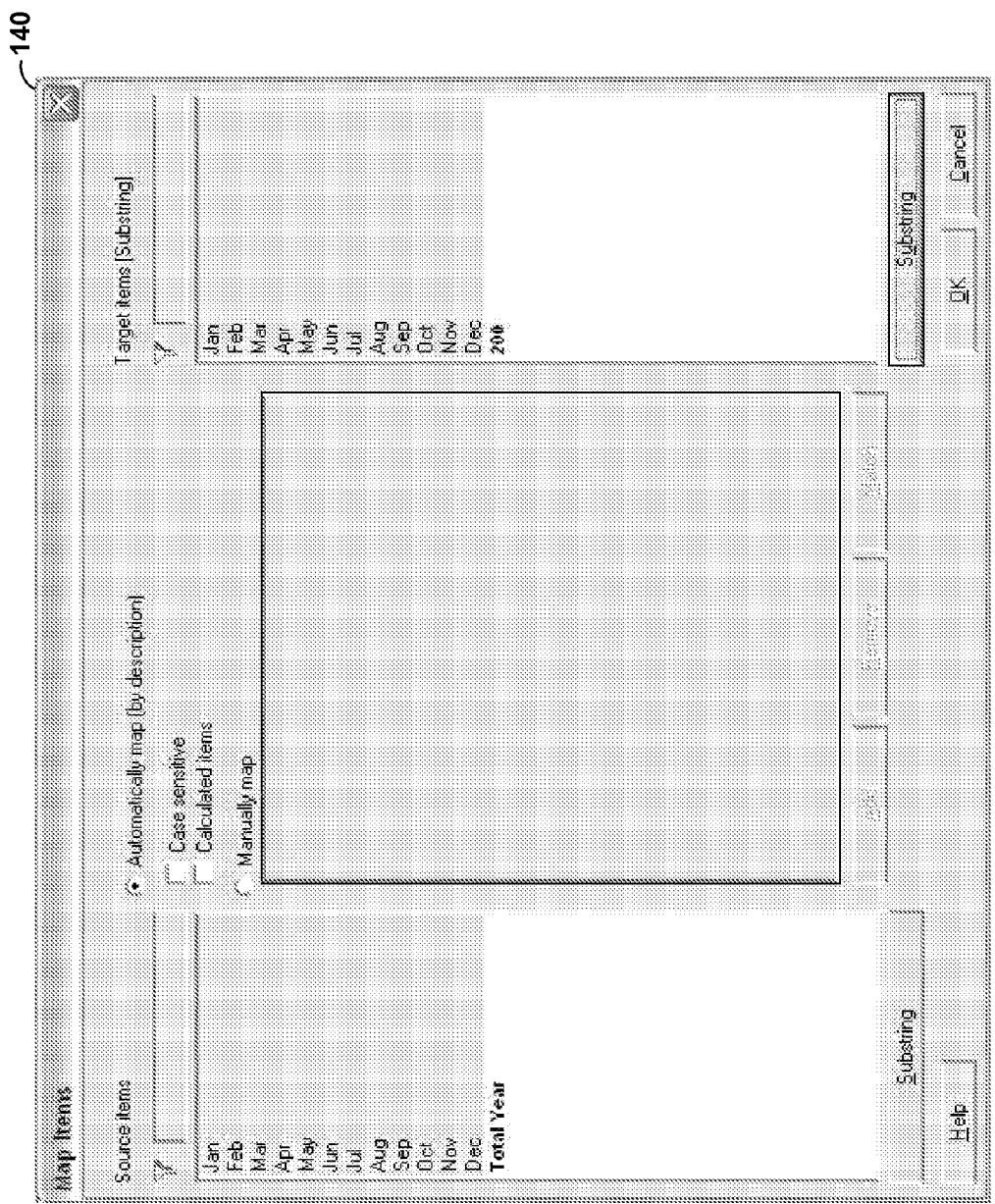

User interface 120 includes substring buttons 121, 122 that allow administrator 15 to perform link "filtering" via substring. In particular, substring buttons 121, 122 allow administrator 15 to define string-based transformations for individual items. FIG. 9, for example, illustrates a user interface 130 by which administrator 15 defines substrings within items for the target "months" dimension. In this example, administrator 15 defines the substring to eliminate the last three characters from each of the items. As a result, the source items and the target items have matching string names, as illustrated in user interface 140 of FIG. 10. This example illustrates one of several types of mapping and filtering capabilities that allow a user to match and map data. For example, link user interface 22 permits mapping as well as matching. Thus, the following are additional examples illustrating the filtering and mapping functionality: (a) mapping of "month 1" through "month 12" to "January-2008" through "December-2008" for a calendar year organization, (b) mapping "mon 1" through "mon 12" to "Jul 05" through "Jun 06" for a fiscal year organization, and (c) filtering and mapping "2005_January" to match "Jan" through use of a substring selecting only the 6th through 8th digit.

Figure 11:
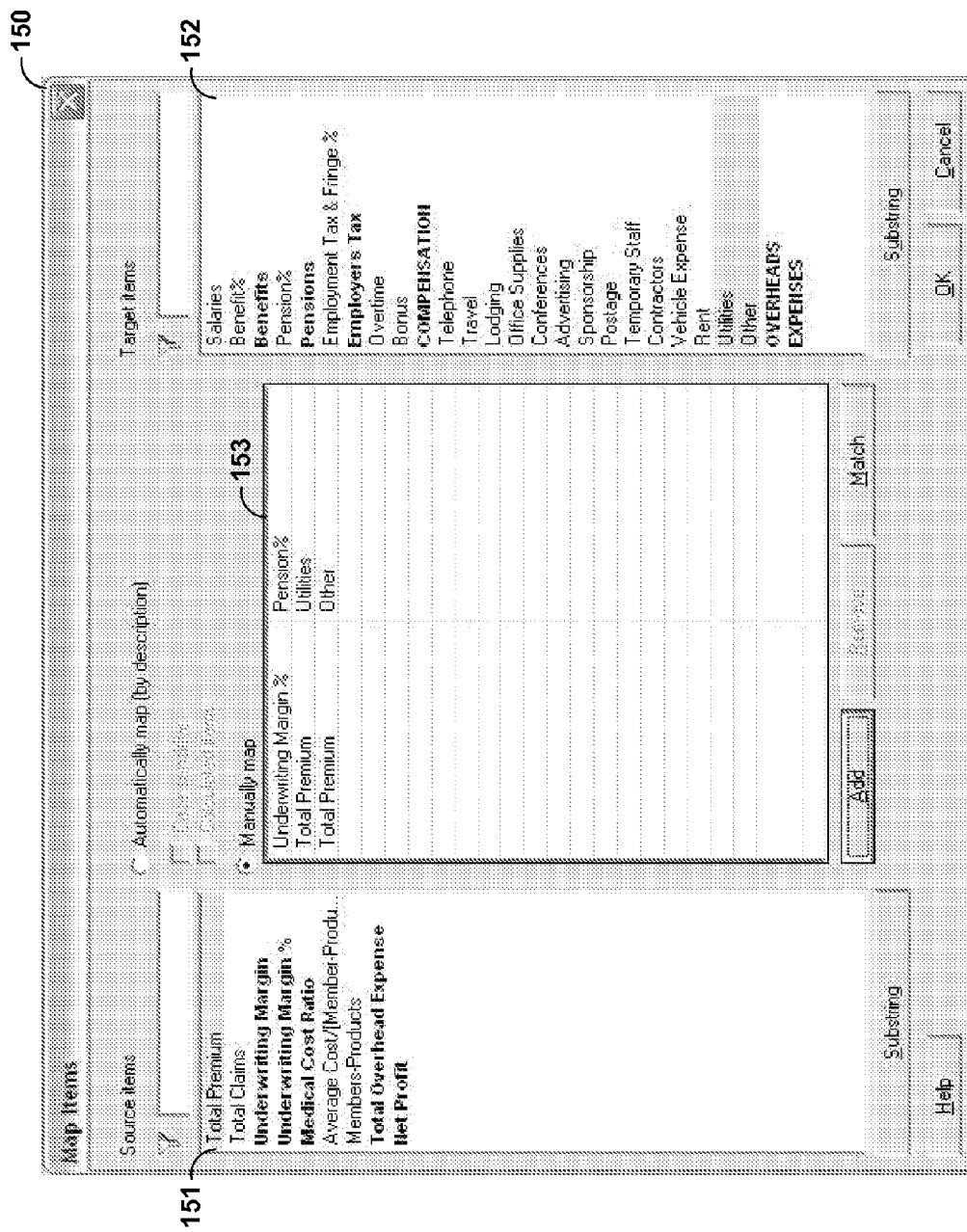

FIG. 11 is a screen illustration of an example user interface 150 in which administrator 15 has elected to manually map individual items between a source dimension and a target dimension. In particular, user interface 150 includes a display area 151 that lists source items along the source dimension, a display area 152 that lists target items along the target dimension, and a mapping area 153 that lists mapping information for the items.

In this example, administrator 15 has mapped source item "Underwriting Margin %" to the target item "Pension %." In addition, administrator 15 has mapped "Total Premium" source item to both "Utilities" and "Other" target items. In other words, amounts for the "Total Premium" dimensional item of the source data cube will be stored to both the "Utilities" and "Other" target dimensional items of the target data cube. In this manner, administrator 15 may define a 1-to-1 mapping, an N-to-1 mapping, a 1-to-N mapping, an M-to-N mapping, or an N-to-N mapping from source items to target items, where M and N are different integers.

Figure 12:
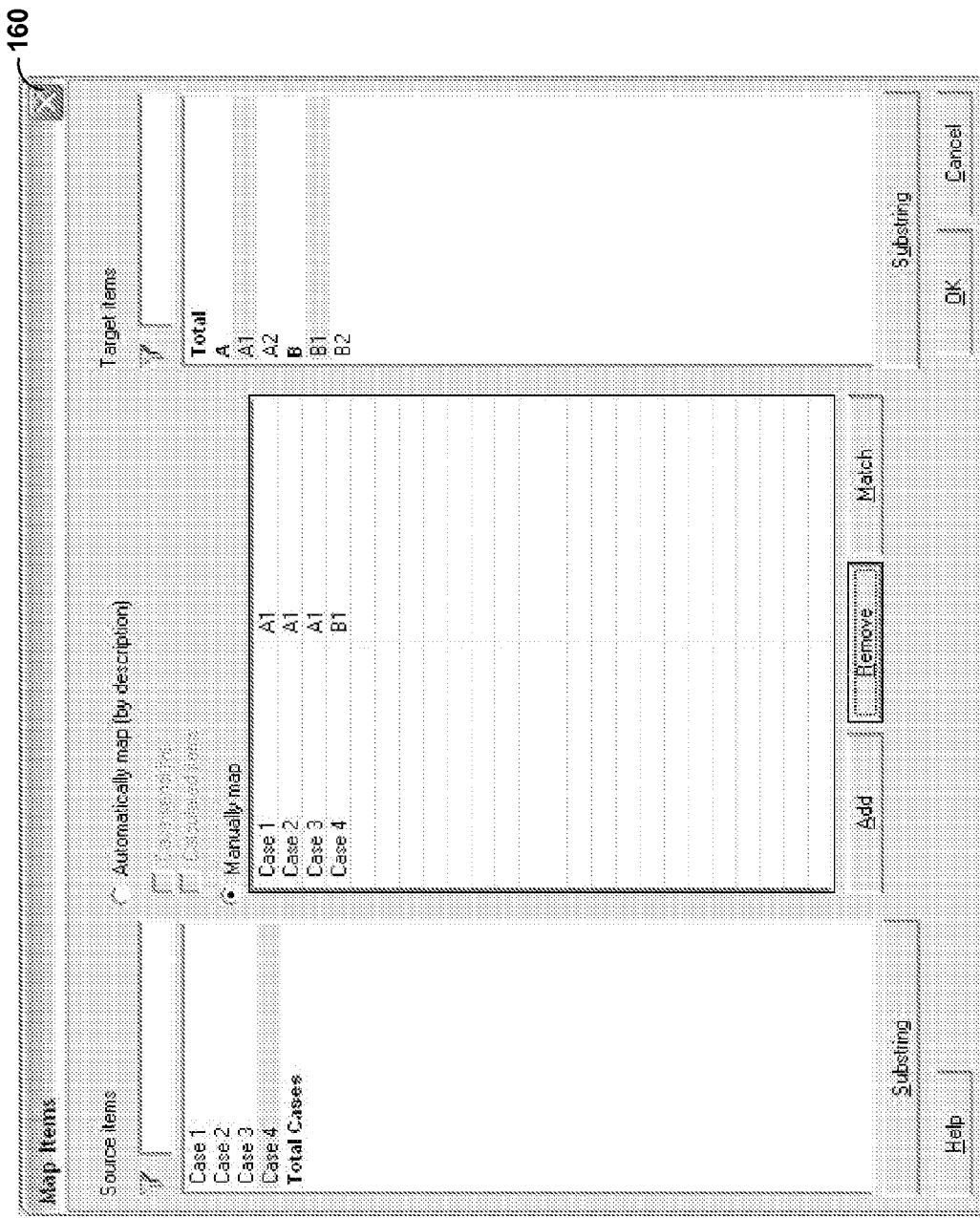

FIG. 12 is a screen illustration of an example user interface 160 in which administrator 15 has defined a manual mapping of source items "Case 1," "Case 2" and "Case 3" to target item "A1." In this manner, administrator 15 may define an N-to-1 data aggregation to be carried out when the link is invoked. In addition, administrator 15 has mapped source item "Case 4" to target item "B1."

Figure 13:
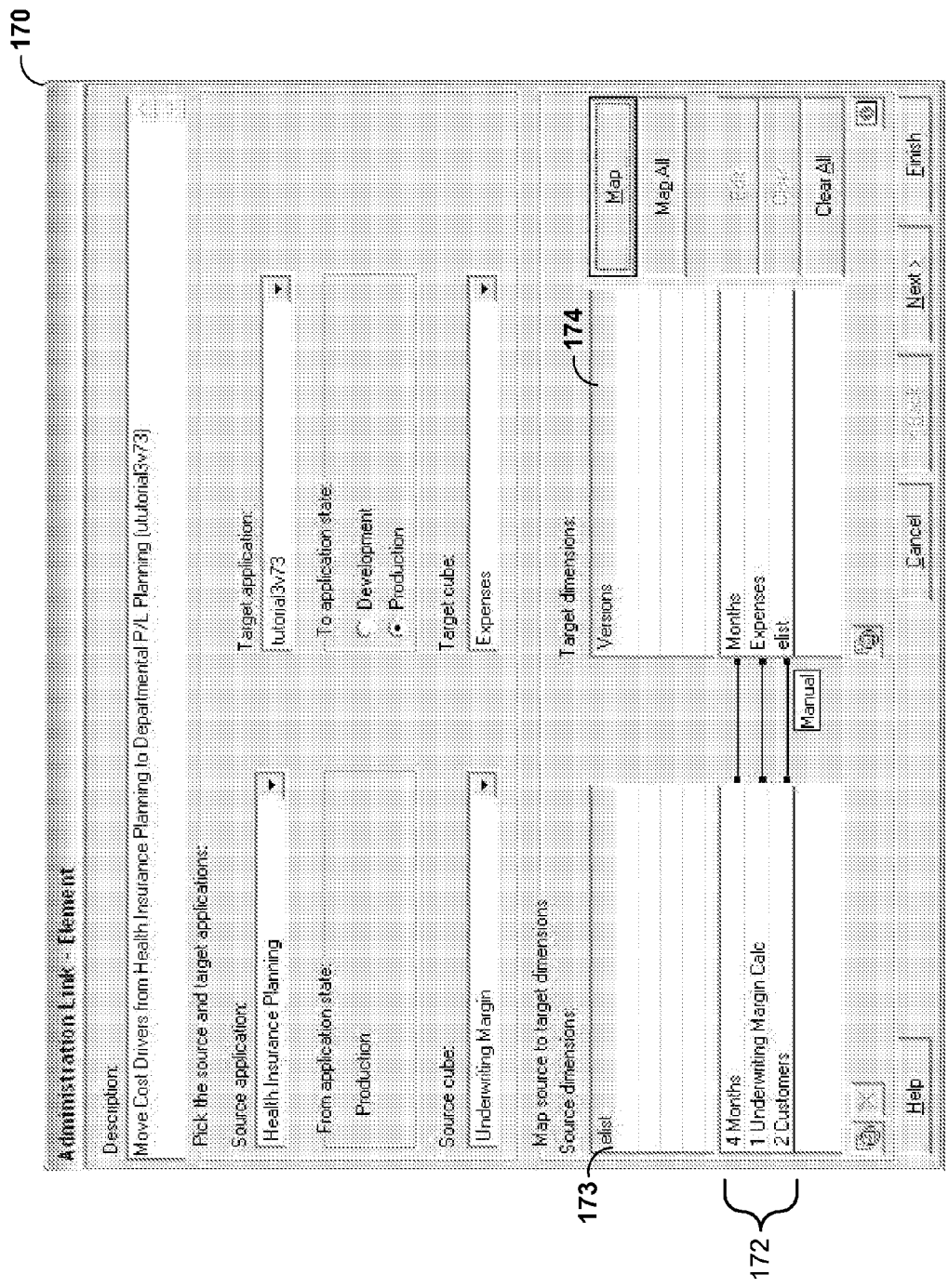

FIG. 13 is a screen illustration of an example user interface 170 in which three dimensions 172 have been mapped between the source and target multidimensional data cubes. User interface 170 also indicates that source dimension 173 and target dimension 174 have not been mapped.

Figure 14:
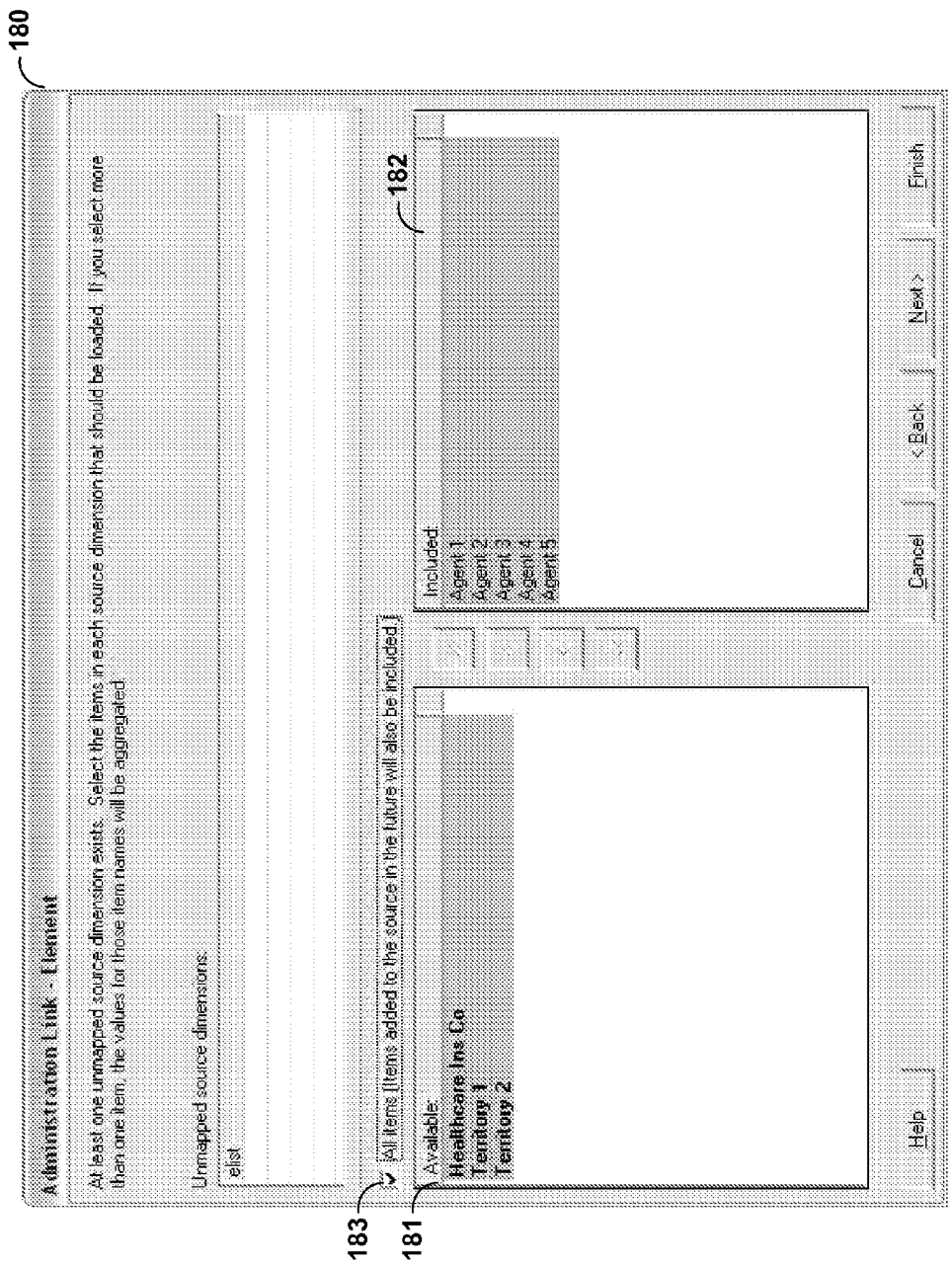
Figure 15:
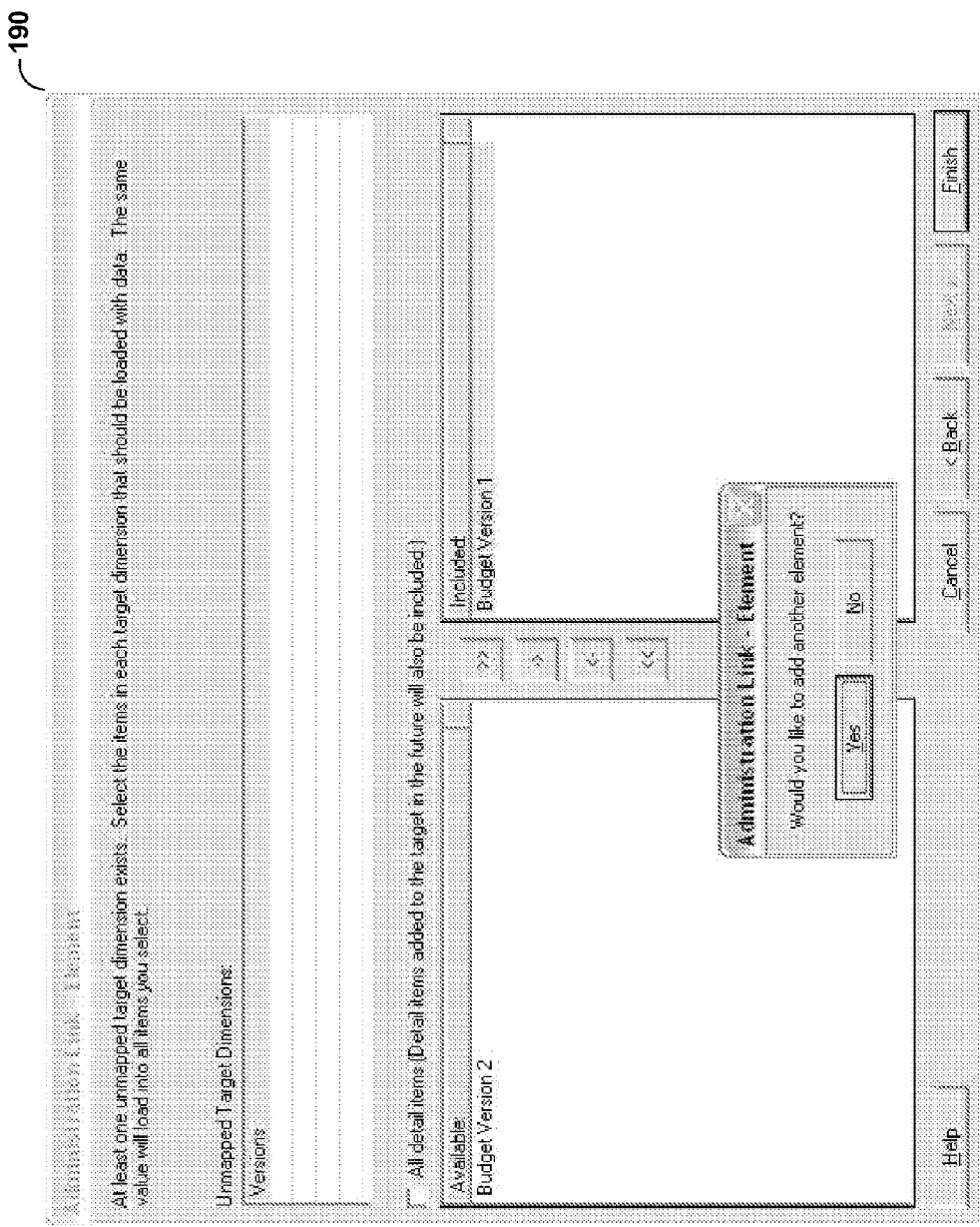

FIG. 14 is a screen illustration of an example user interface 180 with which administrator 15 interacts to handle unmapped source dimensions. As illustrated, user interface 180 includes a display area 181 that lists available items for the unmapped dimension, and a display area 182 that lists items of the dimension to be included and available for aggregation and data movement. In this example, administrator 15 has enabled selection box 183, thereby specifying that all future items added to the source dimension will also be included. In similar, manner, FIG. 15 is a screen illustration of an example user interface 190 with which administrator 15 interacts to handle unmapped target dimensions. Presenting unmapped target dimensions ensures that administrator 14 will apply business decision-making to decide whether to only some or all items on the unmapped target dimensions will receive the data values computed by the link.

Figure 16:
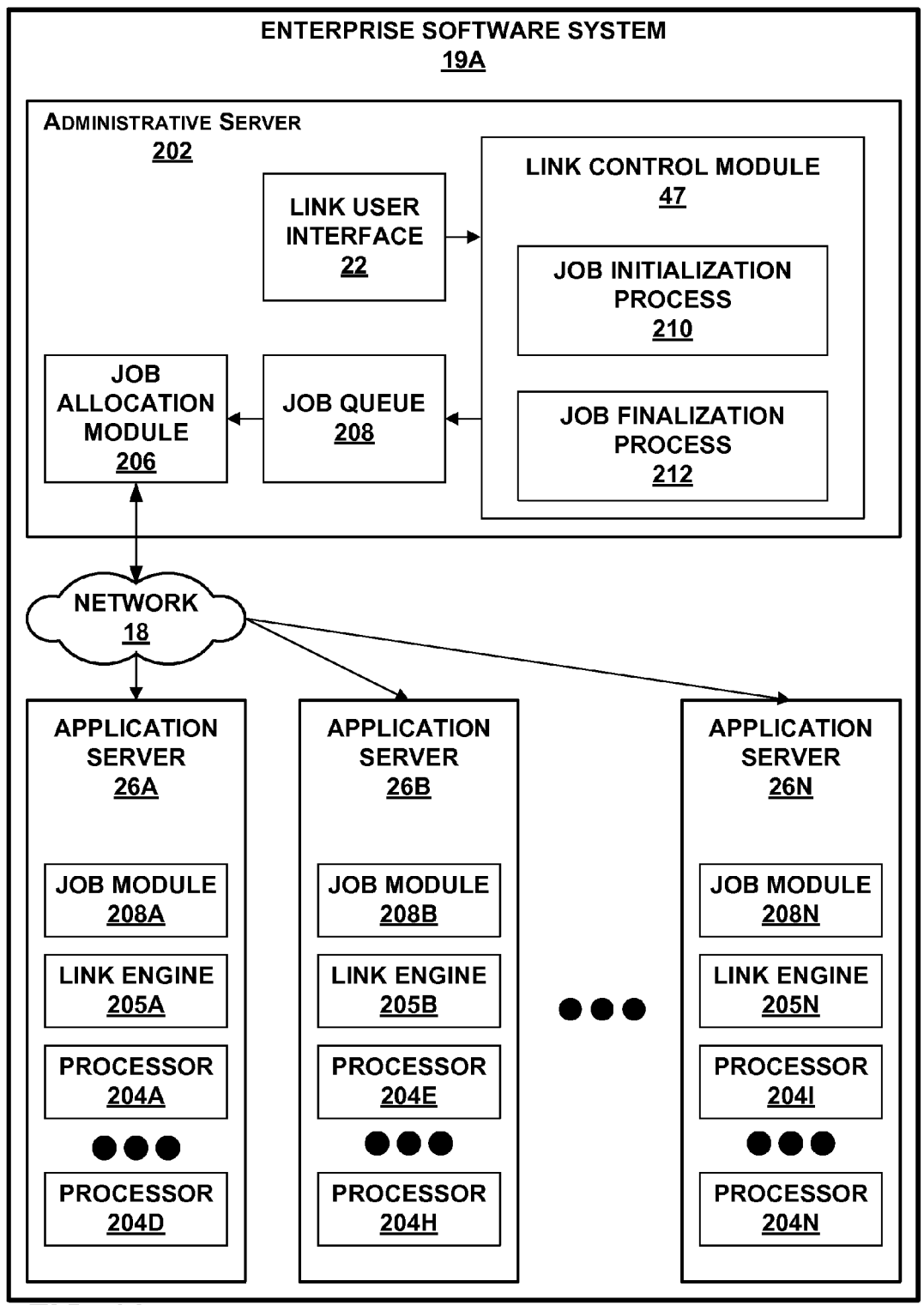
FIG. 16 is a block diagram illustrating additional elements of an enterprise.

FIG. 16 is a block diagram illustrating in further detail elements of enterprise software system 19A for processing jobs to move data among different databases associated with the enterprise software systems. As illustrated in the example of FIG. 16, enterprise software system 19A may further include an administrative server 202 coupled by network 18 to a plurality of application servers 26 (also shown in FIG. 2). Administrative server 202 provides an operating environment for executing software applications that perform administrative functions. In this example, administrative server 202 provides an operating environment for executing link user interface 22, link control module 47, and a job allocation module 206. In addition, administrative server 202 may include data storage modules (e.g., random access memory, disk drives, etc.) that store data used by the administrative functions. For instance, administrative server 202 may include a memory module that stores a job queue 208.

Furthermore, in the example of FIG. 16, each of application servers 26 in enterprise software system 19A may include one or more processors 204A through 204N (collectively, "processors 204"). For instance, application server 26A may include processors 204A through 204D, application server 26B may include processors 204E through 204H, and so on. Each of processors 204 may be microprocessors, application-specific integrated circuits, or other types of programmable processors capable of executing software instructions.

As described above, link control module 47 controls the movement of portions of planning data 42C to one or more multidimensional databases within enterprise software system 19B in accordance with link data 42D. In order to control the movement of data specified by a link (e.g., a user link or an administrative link), link control module 47 generates a "link job." A link job may specify one or more work elements for moving multidimensional data. For example, for an administrative link that specifies multiple work elements to move multidimensional data from a plurality of source models to a plurality of target models, link control module 47 may initially create a link job that specifies each of the work elements.

In addition to the work elements, the link job defines a job initialization process and a job finalization process. For purposes of explanation, FIG. 16 shows administration server 202 executing a job initialization process 210 of a link job currently being performed. However, any link job, and its constituent components of a job initialization process, work elements and job finalization process, may execute on any of application servers 26. In general, job initialization process 210 executes on administrative server 202 or one of the application servers 26 to create and control the execution of the work elements for the given link job. Once created, the individual work elements of the link job are allocated across application servers 26, as described in further detail below. Job initialization process 210 may, for example, initialize job modules 208A through 208N (collectively, "job modules 208") and link engines 205A through 205N (collectively, "link engines 205") in application servers 26 to carry out the work elements defined for a given the link job. The job finalization process for a given link job executes on one of the application servers 26 upon completion of all of the work elements for that link job.

When preparing a link job for execution (e.g., in response to a triggering event), link control module 47 may generate the data structure defining the link job, generate data structures to define the work elements, and add these work elements to the link job. A work element may be viewed as a data structure that specifies one or more source items in a source enterprise model and one or more target items in target enterprise model, such as items along an elist dimension as discussed in more detail below. Moreover, the source enterprise model and target enterprise model may be associated with different enterprise software systems, e.g., systems 19A, 19B.

When link control module 47 generates a link job and any associated work elements, link control module 47 may add the work elements to job queue 208. Job queue 208 may comprise a data structure that stores one or more work elements. Job allocation module 206 removes work elements from job queue 208 and assigns the work elements to various ones of application servers 26A through 26N. Alternatively, application servers 26 may monitor job queue 208 and retrieve work elements for link jobs based on resource loading of the application servers. Work elements assigned to application servers 26A through 26N cause job modules 208An through 208N and link engines 205A through 205N on respective ones of application servers 26A through 26N to execute the work elements, i.e., to move multidimensional data associated with the source items specified by the work element into the target items specified each of the work elements.

As described herein, link control module 47 generates link jobs and the work elements specified for each link job to improve efficiencies of performing the data movements. In general, a single link may map one or more source items to one or more target items. An administrative link, for example, may map two different source items to three different target items. Moreover, the source items may be associated with the same or different source enterprise models; similarly, the target items may be associated with the same or different target enterprise models. Link control module 47 analyzes the link definition, determines the relationships of the source items and target items, and divides the work of executing the link among multiple work elements. For example, if a link maps a first source item to a first target item and a second target item, and if the link maps a second source item to a third target item, link control module 47 may divide the work of performing this link in various ways. For instance, link control module 47 may generate a first work element that specifies movement of data between the first source item and the first and second target items, and may generate a second work element that specifies movement of data between the second source item and the third target item. Alternatively, link control module 47 may generate a first work element that specifies movement of data between the first source item and the first target item, and may generate a second work element that specifies movement of data between the first and second source items and the second and third target items.

The way in which link control module 47 divides the work of executing a link among work elements may have a significant impact on how quickly the link is executed. For example, when one of link engines 205 executes a work element, the link engine may extract source items specified by the work element from a source model. Extracting the source items may be a computationally expensive operation because, in order to extract the source items, the link engine may be required to load a source model and at least one data cube of the source model. When the link engine loads a data cube, numerous values in the data cube may need to be calculated. All of these operations may take considerable time. However, link control module 47 may attempt to reduce the overall computational expense of loading the source model and the target model by dividing the work of executing a link among work elements such that these computational expenses are minimized. Link control module 47 may attempt to minimize these computational expenses by minimizing the number of times each source item is extracted from the source model and by minimizing the number of work elements required to execute a link. The following figures and associated description illustrate example operations by which link control module 47 may attempt to generate work elements such that these computational expenses are minimized.

Figure 17:
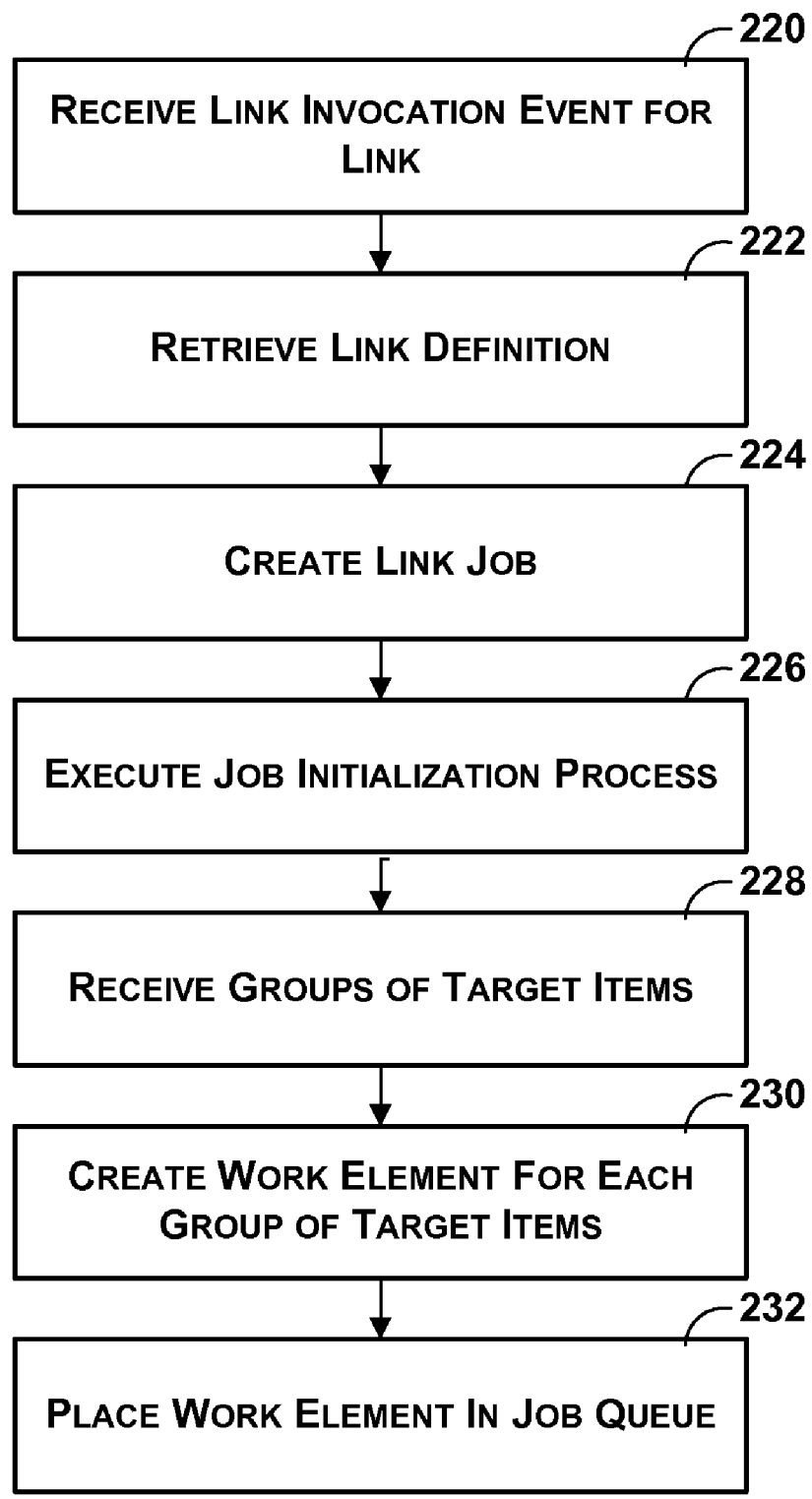
FIG. 17 is a flowchart illustrating an exemplary operation of a link control module.

FIG. 17 is a flowchart illustrating an exemplary operation of link control module 47. Initially, link control module 47 may receive a system event to invoke a link (220). For example, link control module 47 may receive the system event when one of users 12 requests the execution of the link or may receive the system event from an automated process. After receiving this system event, link control module 47 may retrieve a link definition of the link from link data 42D (222). Link control module 47 may then use the link definition to create a new link job (224). As discussed above, a link job may be a data structure that specifies parameters for job initialization process 210, one or more work elements, and a job finalization process 212. Job initialization process 210 may execute on administrative server 202 or any of application servers 26 before any of the work elements, and may serve to set up data structures needed by the work elements in order to operate. Job finalization process 212 may execute after all of the work elements of a link job are processed. Link control module 47 may add work elements to a link job after the link control module has created the link job.

Figure 18:
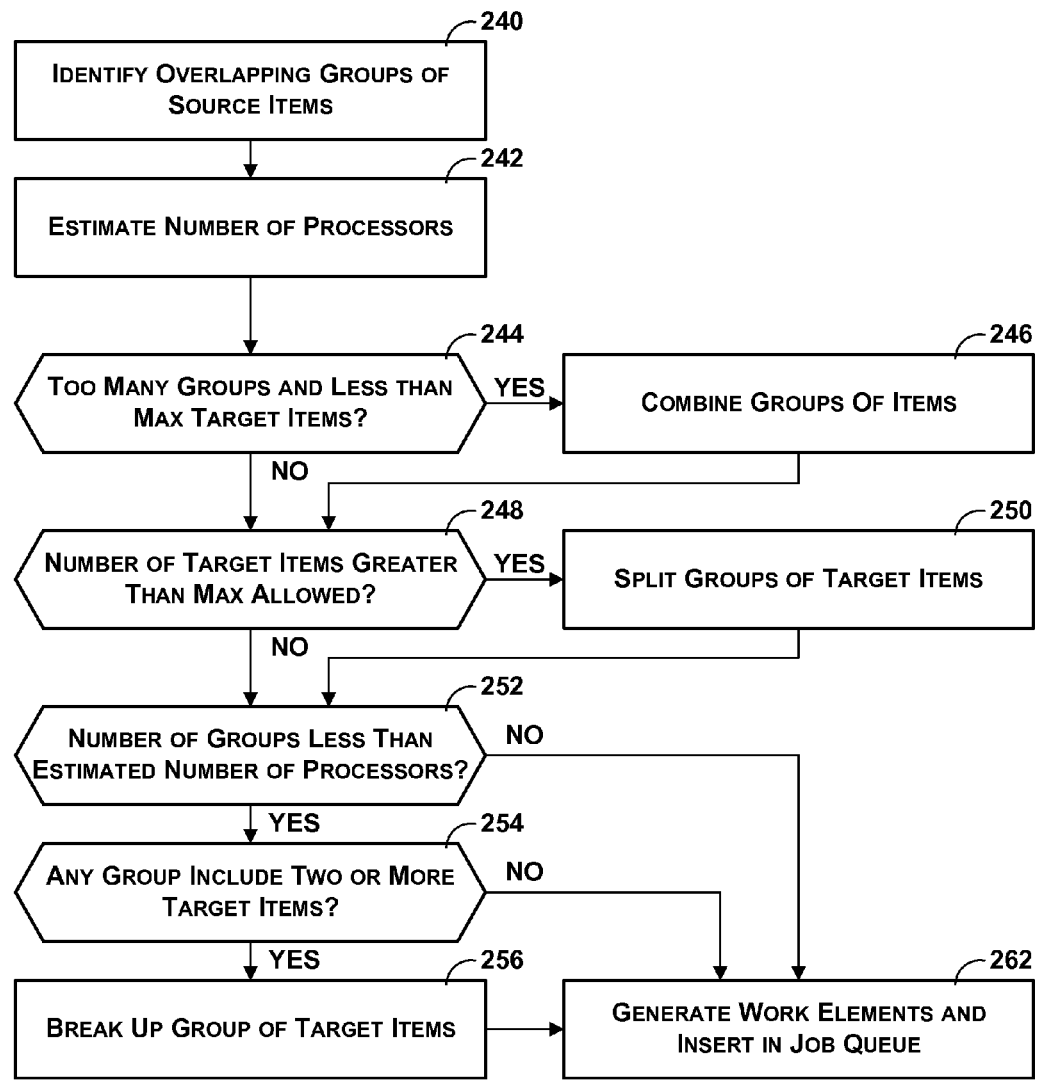
FIG. 18 is a flowchart illustrating an exemplary operation of a job initialization process.

After creating the new link job, link control module 47 may cause administrative server 202 to execute job initialization process 210 for the new link job (226). Job initialization process 210 causes administrative server 202 to identify the one or more groups of target items and to generally set up application servers 26. After job initialization process identifies the one or more groups of target items, link control module 47 may receive data that indicate the identified groups of target items (228). Each group of target items may specify one or more of the target items specified by the link. FIG. 18, below, provides an example operation of job initialization process 210.

Next, link control module 47 creates an individual work element for each of the groups of target items received from job initialization process 210 (230). Each of the work elements may specify the target items in one or more of the groups of target items and any source item that the link maps to those target items. After link control module 47 creates a work element for each of the groups of target items, link control module 47 may place each of the individual work elements units associated with the link job in job queue 208 (232). Job allocation module 206 may then remove work elements from job queue 208 and allocate the work elements to any one of application servers 26 that is configured to process the work element.

FIG. 18 is a flowchart illustrating an exemplary operation of job initialization process 210. Initially, job initialization process 210 identifies groups of target items that have overlapping groups of source items (240). For example, suppose that item A, item B, and item C are target items and suppose that items X, Y, and Z are source items. In this example, source items X and Y may be mapped to target item A, item Z may be mapped to target item B, and item X may be mapped to target item C. Because the link maps source item X to target item A and to target item C, the groups of source items mapped to target item A and target item C overlap. For this reason, the job initialization process may identify target items A and C as a group of target items. In addition, job initialization process 210 may identify target item B as a separate group of target items. Job initialization process 210 identifies groups of target items that contain one or more common source items because it may only be necessary to load the common source items once in order to execute a work element that specifies the common source items. In contrast, if a link maps one source item to two target items and the target items were not grouped, it may be necessary to load the source item twice. Because it may be computationally expensive to load source items, it may be advantageous to reduce the number of times source items are loaded when executing a link.

After identifying groups of target items that are mapped to a common set of source items, job initialization process 210 may estimate a number of available processors in application servers 26 (242). For example, enterprise software system 19A may include two application servers 26A and 26N. Based on input from administrator 15, job initialization process 210 may estimate that both application server 26A and application server 26N include four processors. Hence, job initialization process 210 may estimate that application servers 26 include eight processors. In another example, job initialization process 210 may interrogate each of application servers 26 in order to determine how many how many application servers are in enterprise software system 19A or to determine how many processors are included in each of application servers 26.

Next, job initialization process 210 may determine whether there are too many groups of target items (244). For example, job initialization process 210 may determine that there are too many groups of target items when the estimated number of processors in application servers 26 is significantly less than the number of groups of target items. If job initialization process 210 determines that there are too many groups of target items ("YES" of 244), job initialization process 210 may combine two or more of the groups of target items into a single group of target items (246). For example, a first group of target items may include target items A and B and a second group of target items may include target items C and D. If job initialization process 210 estimates that there is only one available processor, job initialization process 210 may combine the first group and the second group. In this way, a single group of target items may include target items A, B, C, and D.

Combining groups of target items in this way reduces the number of groups of target items and thereby reduces the number of work elements. Because the number of work elements is reduced, there may be a reduction in the number of times that job modules 208 invoke link engines 205. Reducing the number of times that job modules 208 invoke link engines 205 may increase performance because it may be computationally expensive to invoke link engines 205. However, it may not be advantageous to reduce the number of work elements below the number of available processors. This is because link engines 205 executing on the processors may be able to perform the work elements in parallel.

When job initialization process 210 determines that there are not too many groups of target items ("NO" of 244), job initialization process 210 may determine whether the number of target items in any of the groups of target items is greater than a maximum permitted number of target items allowed in a single group of target items (248). Administrator 15 may set the maximum permitted number of target items based on the memory capacity of application servers 26. If each of application servers 26 includes large memory capacities, administrator 15 may the set the maximum permitted number of target items to a relatively high value because each of application servers 26 may store more target items in memory.

If the number of target items in one of the groups of target items is greater than a maximum number of target items permitted in a single group of target items ("YES" of 248), job initialization process 210 may split this group of target items into two or more groups such that none of the groups of target items include more target items than the maximum number of target items permitted in a single group of target items (250). For example, suppose that administrator 15 has set the maximum number of target items allowed in a single group of target items at ten. In this example, a group of target items may include twenty-four target items. Because twenty-four target items exceeds the maximum number of allowed target items in a group of target items, job initialization process 210 may split this group of target items into three groups of eight target items.

If there is no group of target items that includes more target items than the maximum number of target items allowed in a single group of target items ("NO" of 248), job initialization process 210 may determine whether the number of groups of target items is less than the estimated number of processors in each of application servers 26 (252). If job initialization process 210 determines that the number of groups of target items is less than the estimated number of processors in each of application servers 26 ("YES" of 252), job initialization process 210 may determine whether any of the groups of target items includes two or more target items (254). If at least one of the groups of target items includes two or more target items ("YES" of 254), job initialization process 210 may break up one or more groups of target items into two or more groups of target items such that the number of groups is no longer less than the estimated number of processors (256).

After breaking up a group of target items into two or more groups of target items, or if none of the groups of target items includes two or more target items ("NO" of 254) or if the number of target items is greater than or equal to the estimated number of processors in application servers 26 ("NO" of 252), job initialization process 210 then generates the work elements to be inserted in job queue 208 and allocated to the configured application servers (262).

Figure 19:
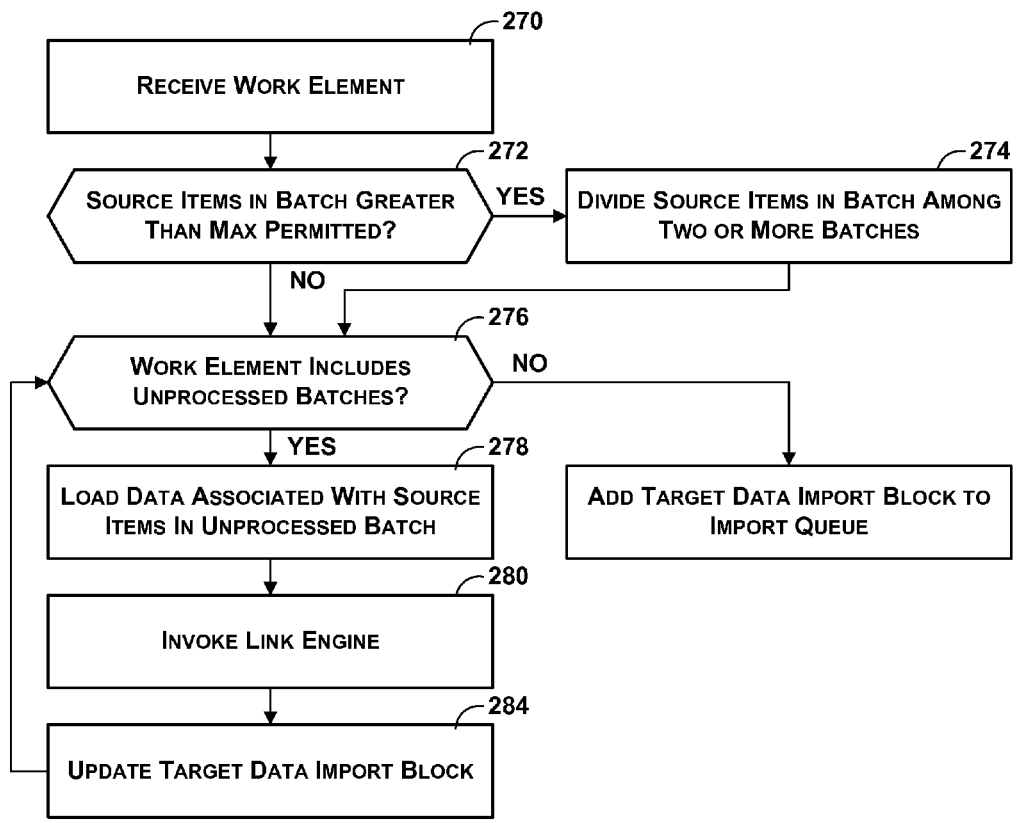
FIG. 19 is a flowchart illustrating an exemplary operation of a job module and a link engine when performing a work element.

FIG. 19 is a flowchart illustrating an exemplary operation of one of job modules 208 and one of link engines 205 when executing a work element. For purposes of explanation, FIG. 19 is explained in reference to job module 208A and link engine 205A. Nevertheless, any of job modules 208 and link engines 205 may perform this example operation.

Initially, job module 208A may receive a work element from job allocation module 206 (270). As used in this disclosure, a "batch" is a set of source items that may be processed in a single operation. After receiving the work element, job module 208A may determine whether the total number of source items is greater than a maximum number of source items permitted in a single batch (272). For example, administrator 15 may provide a link tuning parameter that specifies that a batch may not include more than ten source nodes. For example, the memory modules of application servers 26 only have enough capacity to store multidimensional data associated with ten source items. If a work element significantly exceeds the maximum allowed source nodes for a single batch, it is unlikely that, the memory module of the application server to which the work element was assigned would be capable of storing the multidimensional data associated with all of the source items at one time.

If the number of source items specified by a batch in the work element is greater than the number of source items that may be processed in one batch ("YES" of 272), job module 208A may divide the source items in the batch into two or more batches of source items (274). For example, if the maximum number of source items in a batch is ten and the work element specifies twenty source items, job module 208A may divide the source items into two batches, each of which specify ten source items.

After dividing the source items into batches or after determining that the number of source items specified by the work element is not greater than the number of source items that may be processed in one batch ("NO" of 272), job module 208A may determine whether there are any unprocessed batches in the work element (276). If there are unprocessed batches in the work element ("YES" of 276), the work elements may load multidimensional data associated with the source items in one of the batches into a memory module of application server 26A (278). After job module 208A may load multidimensional data associated with the source items in one of the batches, job module 208A may invoke link engine 205A (280).

When invoked, link engine 205A may use the data associated with the source items to create a target data import block per target item processed by the work element; these may be used to integrate data into the target model (284). Job module 208A may then loop back and determine whether there are any remaining unprocessed batches in the work element and continue to update the target import blocks in this manner (276). During this process, link engine 205A may apply one or more transformations to the data associated with the source items in accordance with the link definition. For example, link engine 205A may add values of each source item mapped to a target item. After link engine 205A finishes updating the target data import blocks, job module 208A adds the target data import blocks to an import queue of the target model for processing (286). The target data import blocks of the import queue of the target model are processed, as described above, to import and integrate the source data into the target model.

FIGS. 20A through 20F (collectively, "FIG. 20") illustrate various example links. Furthermore, FIG. 20 illustrate how job initialization processes for respective ones of the links may divide target items of the links among one or more groups of target items. In FIG. 20, source items and target items are represented as circles. An arrow represents a mapping from a source item to a target item. Boxes with dotted borders represent groups of target items as determined by the job initialization processes upon analyzing the link definitions. In the examples of FIGS. 20A-20F, job initialization process 210 estimates that there are four available processors in application servers 26. Furthermore, administrator 15 may limit the maximum number of target items in a work item to three target items.

FIG. 20A illustrates an example link 300 that maps source items to target items on a one-to-one basis. In link 300 there are five source items and five target items. Link 300 maps each of the source items to exactly one target item. When a job initialization process of link 300 identifies overlapping groups of source items, the job initialization process of link 300 may initially identify five different groups of target items. The job initialization process of link 300 next determines that there are more groups of target items than there are processors in application servers 26. For this reason, the job initialization process of link 300 merges two of the groups of target items. In this way, the job initialization process of link 300 identifies four groups of target items, three of which specify one target item each and one of which specifies two target items.

FIG. 20B illustrates an example link 310 that maps one source item to five different target items. When a job initialization process of link 310 identifies overlapping groups of source items, the job initialization process of link 310 may initially identify one group of target items that includes all five target items. Furthermore, the job initialization process of link 310 may determine that there are fewer groups of target items than there are available processors in application servers 26. Because there are fewer groups of target items than there are available processors in application servers 26, the job initialization process of link 310 does not attempt to further consolidate the groups of target items. However, the job initialization process of link 310 may determine that the number of target items in the group of target items is greater than the maximum permitted number of target items in a group. For this reason, the job initialization process of link 310 may divide the target items in the group into a first group that specifies three target items and a second group that specifies two target items. Next, the job initialization process of link 310 may determine that there are fewer groups of target items than there are processors. For this reason, the job initialization process of link 310 may divide the first group and the second group such that there are now four groups of target items: three of which specify one target item and one of which specifies two target items.

FIG. 20C illustrates an example link 320 that maps each source item to two target items. When a job initialization process of link 320 identifies overlapping groups of source items, the job initialization process of link 320 may place target item A and target item B in a first group, target item C and target item D in a second group, and target node E and target node F in a third group. Because there are fewer groups than there are available processors in application servers 26, the job initialization process of link 320 does not further consolidate the groups. Furthermore, because none of the groups include more than maximum permitted number of target items, the job initialization process of link 320 does not divide any of the groups. However, the job initialization process of link 320 may determine that there are fewer groups than there are available processors. For this reason, the job initialization process of link 320 may split one of the groups into two groups. Hence, the job initialization process of link 320 may identify four groups of target items for link 320: two of which specify two target items and two of which specify one target item each.

FIG. 20D illustrates an example link 330 that maps five source items to one target item. When a job initialization process of link 330 identifies overlapping groups of source items, the job initialization process of link 330 may place target item A in a first group. Because there is only one group, the job initialization process of link 330 cannot further consolidate the groups. Furthermore, because the first group only contains a single target item, the job initialization process of link 330 may not divide the first group. However, when job allocation module 206 assigns a work element based on the first group to a job module, the job module may divide the source items into one or more batches, depending on the maximum permitted number of source items in a batch.

FIG. 20E illustrates an example link 340 that maps two source items to each target item. When a job initialization process of link 340 identifies overlapping groups of source items, the job initialization process of link 340 may place target item A in a first group, target item B in a second group, and target item C in a third group. This is because link 340 does not map the any source item to more than one target item. Furthermore, because there are fewer groups of target items than there are available processors, the job initialization process of link 340 does not further consolidate the groups. In addition, the job initialization process of link 340 does not divide the groups because none of the groups includes more than one target item.

FIG. 20F illustrates an example link 350 that maps each source item to each target item. When a job initialization process of link 350 identifies overlapping groups of source items, the job initialization process of link 350 may place target items A, B, C, D, and E in a single group because each of these target items share a common set of source items. Furthermore, because there is only a single group of target items, the job initialization process of link 350 may not further consolidate groups of target items. However, the job initialization process of link 350 may divide the group into two groups of target items because the number of target items in the group exceeds the maximum permitted number of target items in a group. Furthermore, the job initialization process of link 350 may determine that the number of groups of target items is less than the number of available processors. For this reason, the job initialization process of link 350 may divide the groups such that there are four groups of target items. As illustrated in the example of FIG. 20F, the job initialization process of link 350 may place target items A and B in a first group, target item C in a second group, target item D in a third group, and target item E in a fourth group.

Figure 21:
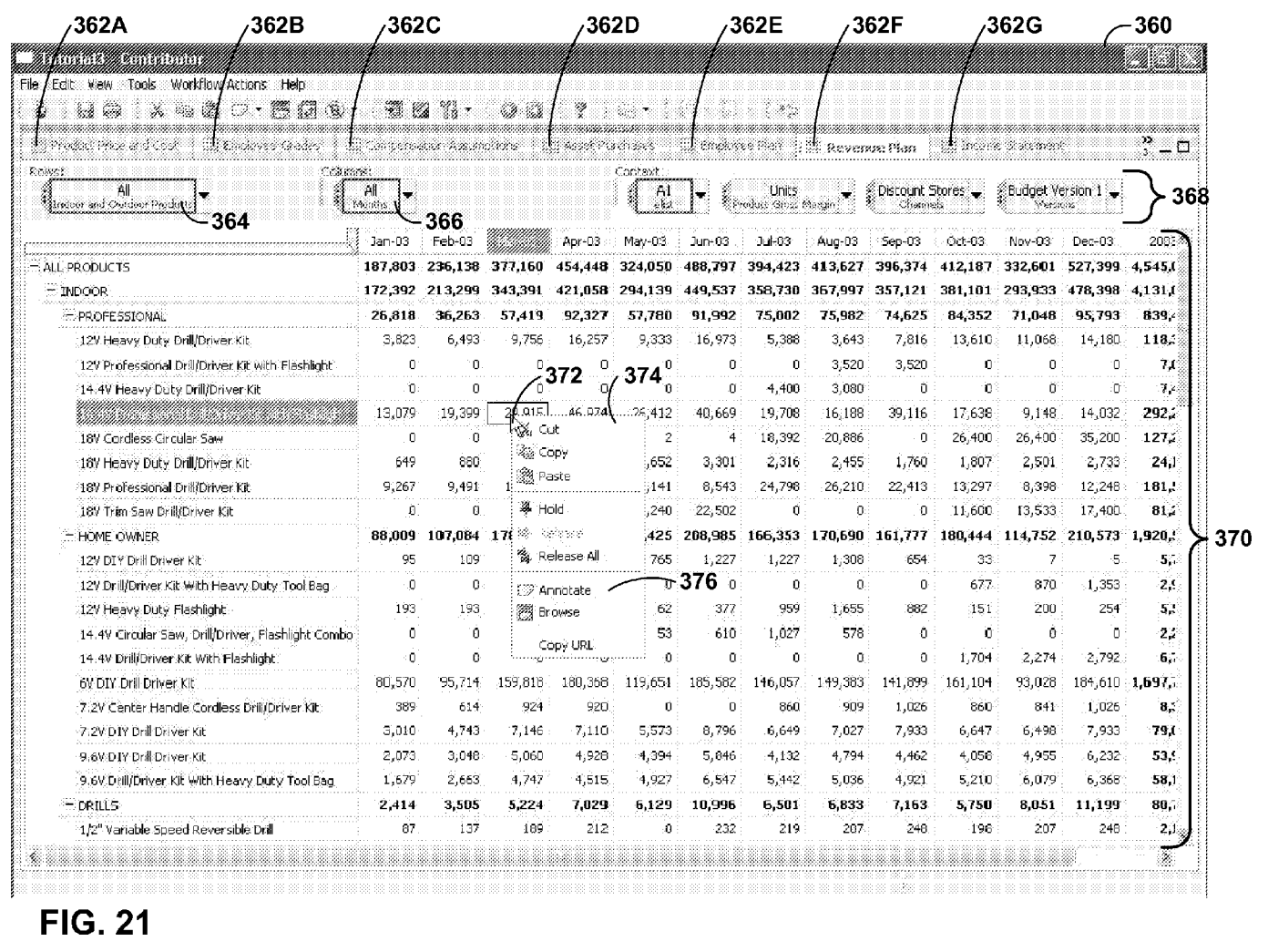

FIG. 21 is a screen illustration of a user interface 360 for viewing and entering planning data. As discussed above, when one of users 12 (e.g., user 12A) needs to enter or view planning data 42C, user 12A may cause computing device 16A to execute application layer 92. When application layer 92 executes, application layer 92 downloads and stores a slice of planning data 42C. This disclosure refers to this downloaded slice as user planning data 94. After application layer 92 stores user planning data 94, application layer 92 may cause computing device 16A to display user interface 360.

User interface 360 presents user planning data 94 in a manner that may be readily understood by a human user. For instance, user interface 360 includes a tab for each data cube in user planning data 94. In the example of FIG. 21, these tabs are indicated by reference numerals 362A through 362G. Tab 362A indicates a "Product Price and Cost" data cube, tab 362B indicates an "Employee Grades" data cube, tab 362C indicates a "Compensation Assumptions" data cube, tab 362D indicates an "Asset Purchases" data cube, tab 362E indicates an "Employee Plan" data cube, tab 362F indicates a "Revenue Plan" data cube, and tab 362G indicates an "Income Statement" data cube.

In order to view and/or edit data in a data cube of user planning data 94, user 12A may use a mouse or other pointing device to click on the one of tabs 362 that indicates the data cube. In the example of FIG. 21, user 12A has clicked on tab 362F that indicates the "Revenue Plan" data cube. When user 12A clicks on one of tabs 362, application layer 92 may cause user interface 360 to include a row selection box 364, a column selection box 366, and a set of context selection boxes 368. User 12A may use row selection box 364 to select items of a dimension of the selected data cube to serve as the vertical axis of a table 370 that presents data in the selected data cube. In the example of FIG. 21, user 12A has used row selection box 364 to select all items of an "Indoor and Outdoor Products" dimension of the "Revenue Plan" data cube. Similarly, user 12A may use column selection box 366 to select items of a dimension of the selected data cube to serve as a horizontal axis of table 370. In the example of FIG. 21, user 12A has used column selection box 366 to select all items of a "Months" dimension of the "Revenue Plan" data cube. User 12A may then use context selection boxes 368 to select one item in each of the other dimensions of the selected data cube. In the example of FIG. 21, the "Revenue Plan" data cube includes an "elist" dimension, a "Product Gross Margin" dimension, a "Channels" dimension, and a "Versions" dimension. Furthermore, in the example of FIG. 21, user 12A has selected the "A1" item for the "elist" dimension, the "Units" item for the "Product Gross Margin" dimension, "Discount Stores" item for the "Channels" dimension, and "Budget Version 1" item for the "Versions" dimension. In this way, user 12A specifies a two-dimensional slice of the data in the selected data cube.

After user 12A uses row selection box 364, column selection box 366, and context selection boxes 368 to specify a two-dimensional slice of the data in the selected data cube, user interface 360 presents the specified two-dimensional slice of the data in the selected data cube as table 370. Each individual cell in table 370 contains data of a cell of the selected data cube that is indicated by an item in the selected row dimension of the selected data cube, an item in the selected column dimension of the selected data cube, and selected items in the context dimensions. For example, a cell in "14.4V Professional Drill/Driver Kit with Flashlight" row and in the "Mar-03" column of table 370 contains data of a cell in the "Revenue Plan" data cube that is located at the "14.4V Professional Drill/Driver Kit with Flashlight" item in the "Indoor and Outdoor Products" dimension, the "Mar-03" item in the "Months" dimension, the "A1" item in the "elist" dimension, the "Units" item in the "Gross Product Margin" dimension, the "Discount Stores" item in the "Channels" dimension, and the "Budget version 1" item in the "Versions" dimension.

User 12A may add annotations to cells in table 370. An annotation may be text-based commentary or other type of descriptive data that user 12A inputs in order to provide additional information about a particular cell. In order to add an annotation to a cell in table 370, user 12A may use a mouse or other input device to position a cursor 372 over a cell in table 370. When user 12A positions cursor 372 over a cell in table 370, user 12A may press a button on computing device 16A in order to cause user interface 360 to display a cell options menu 374. For instance, user 12A may press the right mouse button in order to cause user interface 360 to display cell options menu 374. Cell options menu 374 includes an annotate option 376. If user 12A selects annotate option 376, user interface 360 may cease to display cell options menu 374, but may instead display an annotation entry window that user 12A may use to add an annotation to the cell. An exemplary annotation entry window is illustrated in the example of FIG. 22, below.

Although not illustrated in the example of FIG. 21, user 12A may also position cursor 372 over one of tabs 362. After user 12A positions cursor 372 over one of tabs 362, user 12A may press a button on computing device 16A in order to cause user interface 360 to display a data cube options menu. This data cube options menu may also include an annotate option.

If user 12A selects this annotate option, user interface 360 may display an annotation entry window similar to that which user 12A may use to add an annotation to a cell. User 12A may then use this annotation entry window to add an annotation to the data cube or to some other object. Because a data cube is made up of individual cells, annotations made to the data cube may be, in effect, annotations made to each cell in the data cube.

Figure 22:
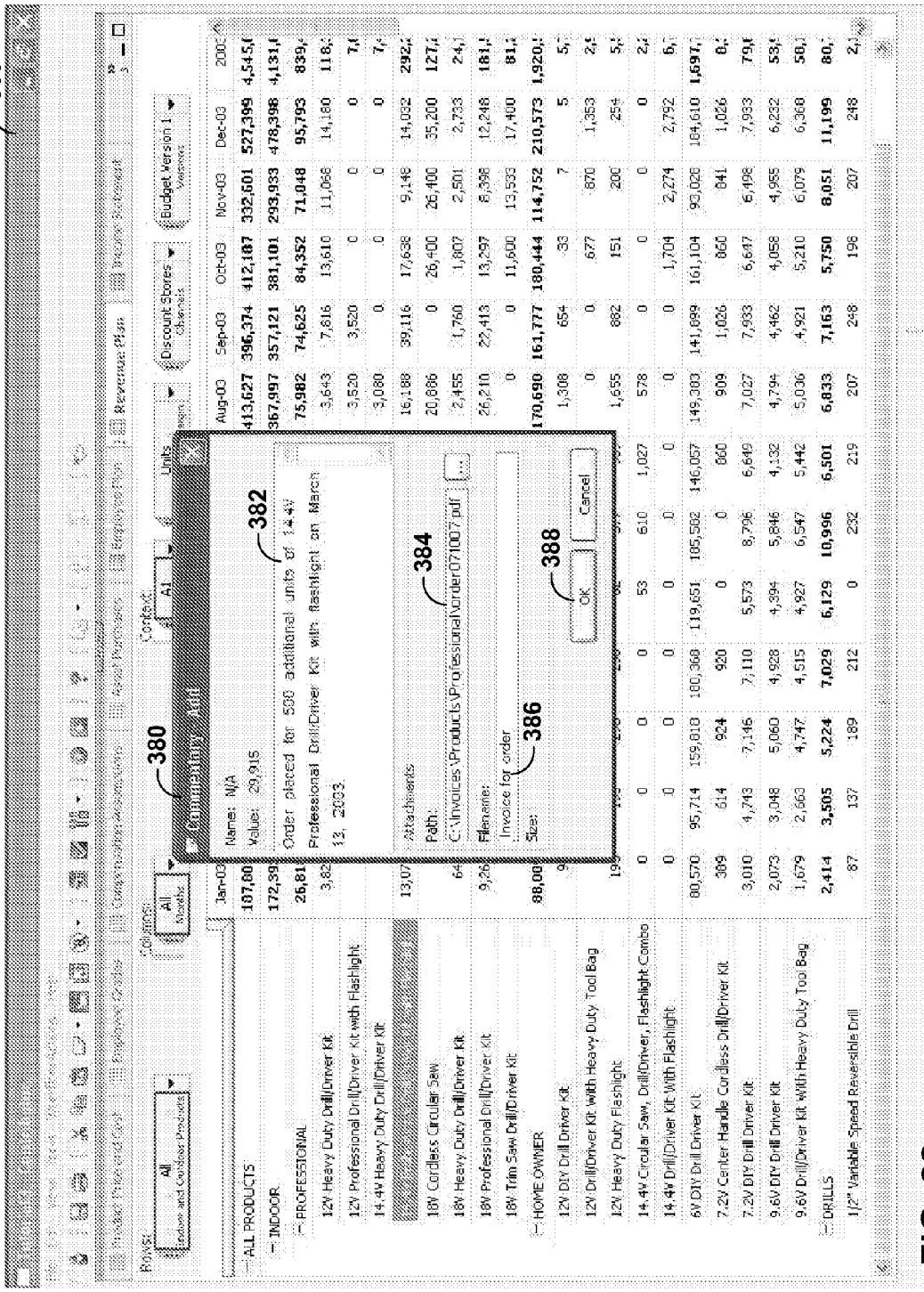
FIG. 22 is a screen illustration of a user interface for viewing and entering planning data upon which an annotation entry window is superimposed.

FIG. 22 is a screen illustration of user interface 360 upon which an annotation entry window 380 is superimposed. User interface 360 may present annotation entry window 380 when user 12A selects annotation option 376 in order to add an annotation to a cell. Annotation entry window 380 includes a comments box 382. User 12A may enter text into comments box 382 in order to provide additional information about a selected cell in table 370. In the example of FIG. 22, user 12A has entered the text "Order placed for 500 additional units of 14.4V Professional Drill/Driver Kit with flashlight on Mar. 13, 2003." This comment might be useful to another one of users 12 who may see the cell in table 370 and wonder why the data in the cell is 500 units higher than when the user previously saw table 370.

Annotation entry window 380 also includes a set of input boxes that allow user 12A to attach one or more files to an annotation for a cell in table 370. For instance, user 12A may attach a file present on a local hard disk of computing device 16A by entering a path to the file in a path field 384. In the example of FIG. 22, user 12A has entered the path "C:\Invoices\Products\Professional\order071007.pdf" into path field 384. This attached file may contain an invoice for the order for 500 drill/driver kits alluded to in comments box 382. A filename box 386 in annotation entry window 380 allows user 12A to enter a user-friendly name for the file attached to the annotation. In the example of FIG. 22, user 12A has entered the name "Invoice for order" in filename box 386.

When user 12A selects an "OK" button 388 of annotation entry window 380, application layer 92 automatically adds the annotation to the cell. In addition, application layer 92 may upload and store any files specified in path field 384.

Figure 23:
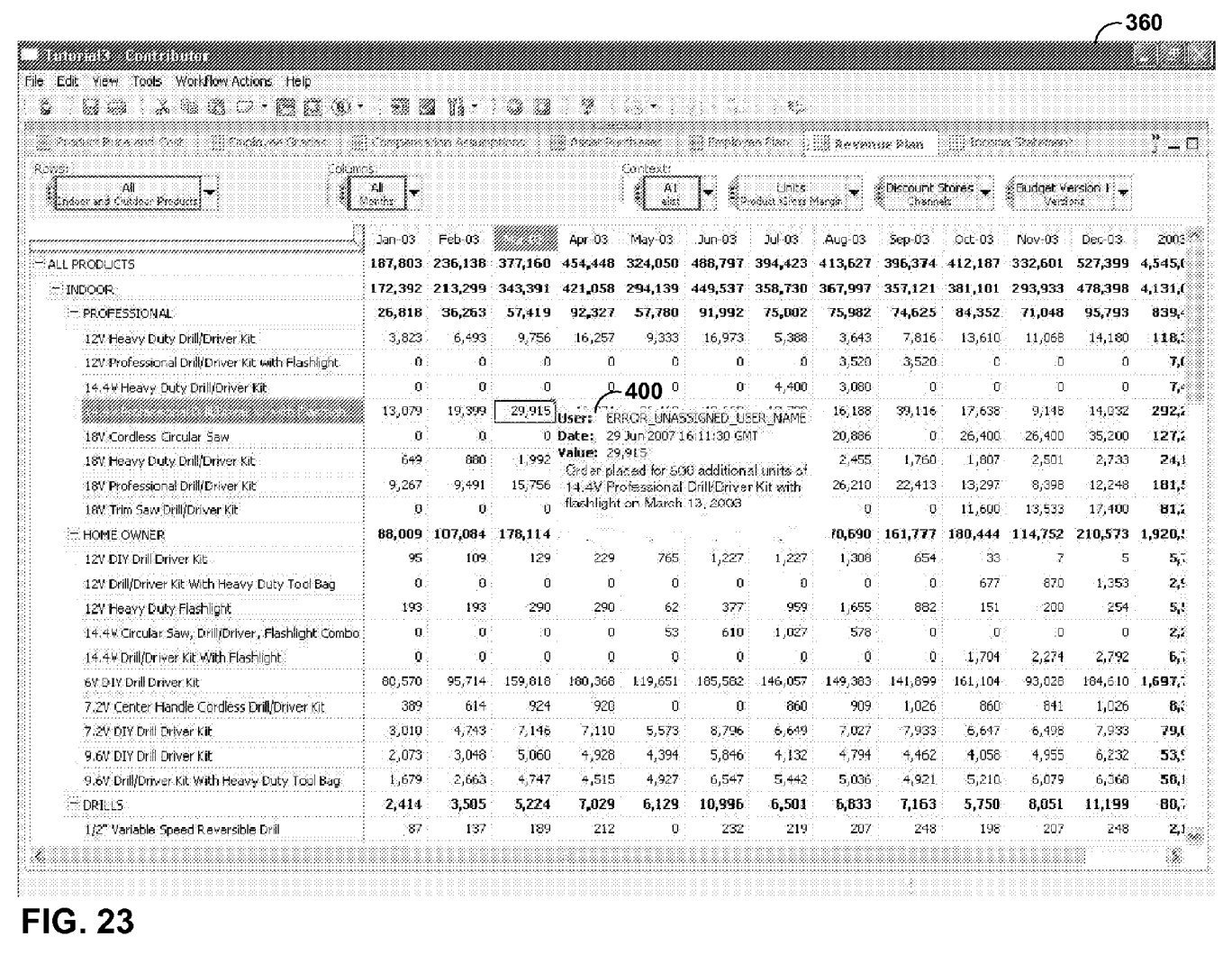

FIG. 23 is a screen illustration of user interface 360 displaying an annotation viewing window 400 for a cell of planning data. After user 12A has added an annotation to a cell in table 370, user 12A or other ones of users 12 may view this annotation. For instance, user 12A may view an annotation by positioning cursor 372 over a cell in table 370 that has an annotation. When user 12A positions cursor 372 over a cell in table 370 that has an annotation, user interface 360 may automatically display annotation viewing window 400. In the example of FIG. 23, annotation viewing window 400 includes the text "Order placed for 500 additional units of 14.4V Professional Drill/Driver Kit with flashlight on Mar. 13, 2003." Note that this text is the same as the text entered in comment box 382.

Figure 24:
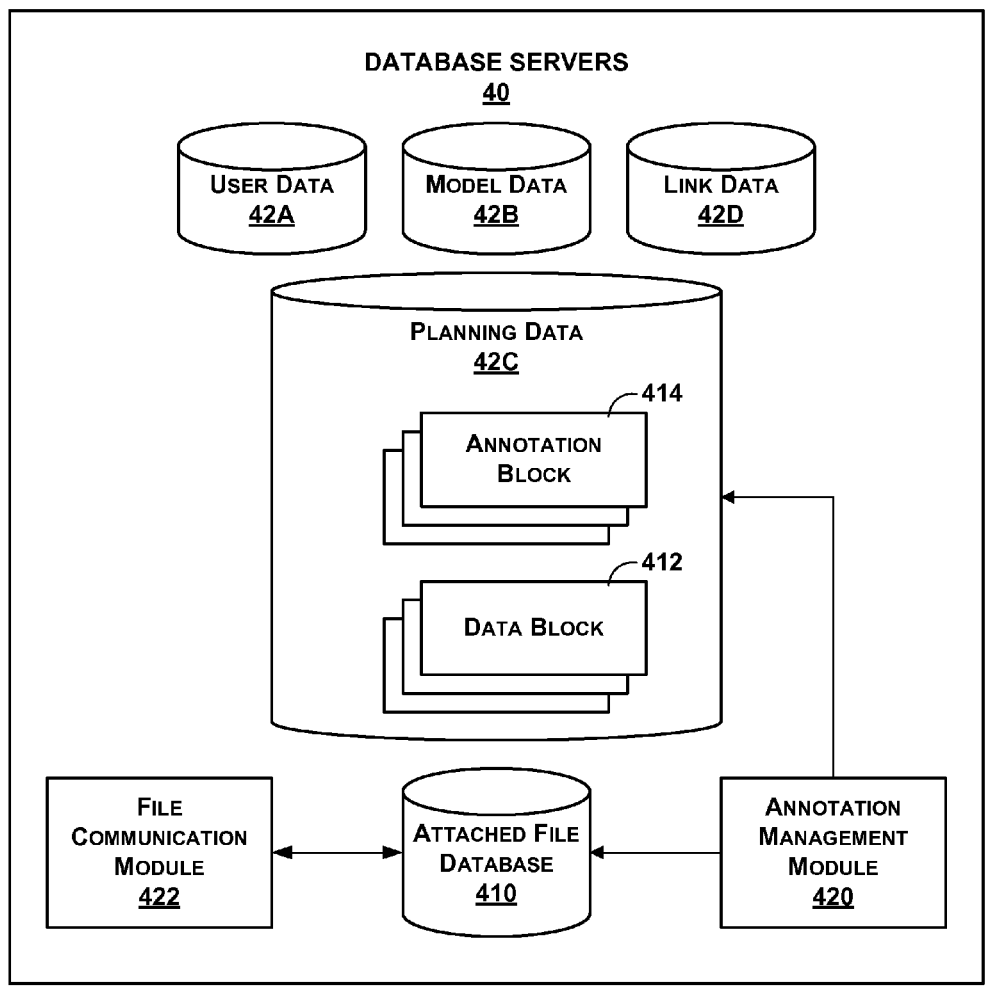
FIG. 24 is a block diagram illustrating exemplary details of database servers of one of the enterprise software systems.

FIG. 24 is a block diagram illustrating exemplary details of database servers 40. As in the example of FIG. 2, database servers 40 store user data 42A, model data 42B, planning data 42C, and link data 42D. However, in the example of FIG. 24, database servers 40 also store an attached file database 410. Attached file database 410 stores copies of files that users 12 have attached to annotations.

As illustrated in the example of FIG. 24, planning data 42C includes a set of data blocks 412 and a set of annotation blocks 414. Set of data blocks 412 may include one data block for each node in the organizational hierarchy. Similarly, set of annotation blocks 414 may include one annotation block for each node in the organizational hierarchy. Each one of data blocks 412 may store planning data associated with one node in the organizational hierarchy. Each one of annotation blocks 414 may contain entries that store annotations related to planning data in one of data blocks 412. For example, a first one of annotation blocks 414 may store annotations regarding individual cells of data cubes contained within a first one of data blocks 412, annotations regarding sets of cells of the data cubes within the first one of data blocks 412, annotations regarding one or more data cubes within the first one of data blocks 412, annotations regarding the first one of data blocks 412, or annotations otherwise regarding the first one of data blocks 412. Data blocks 412 and annotation block 414 may be stored as binary data blocks within planning data 42C.

Entries in annotation blocks 414 may specify information that constitutes an annotation of an individual cell. For example, entries in annotation blocks 414 that constitute an annotation of an individual cell may include a globally unique identifier for an annotation, a value that indicates a type of the annotation, a description field that contains the text of the annotation, an identifier of a user who created the annotation, a name of the user who created the annotation, a timestamp that indicates a time and date when the annotation was created, an identifier of a user who most recently transferred the annotation using a link, a name of the user who most recently transferred the annotation using a link, a timestamp that indicates a time and date when the annotation was most recently transferred using a link, a globally unique identifier that indicates an object (e.g., a data cube or model) in the associated one of data blocks 412 with which the annotation is associated, a globally unique identifier that identifies a node in model data 42B with which the annotation is associated, a reference to a file name of a file attached to the annotation, an indicator of the size of a file attached to the annotation, a field that stores user comments about the file attached to the annotation, references to an item in each of the dimensions of the indicated data cube, and other information. In this example, the text for the annotation may be the text that one of users 12 enters into comments box 382 of annotation entry window 380 (FIG. 22). Furthermore, in this example, the combination of references to items in each of the dimensions of the indicated data cube may uniquely identify the cell that is annotated by this annotation.

In addition to annotations of individual cells, entries in annotation blocks 414 may specify information that constitutes an annotation of a data cube, set of data cubes, one of data blocks 412, or other higher-level object. For instance, entries in annotations blocks 414 that specify information that constitutes an annotation of a data cube may include the same types of information as entries in annotation tables 414. However, because such entries are not annotations of any specific cell, such entries may not include data that indicates specific cells of data cubes. For instance, such entries may not specify items for each of the dimensions of a data cube in an associated one of data blocks 412.

When user 12A instructs application layer 92 to create a new annotation (e.g., by clicking on "OK" button 388 in FIG. 22), application layer 92 may store the new annotation on client device 16A. Subsequently, when user 12A instructs application layer 92 to save user planning data 94 back to enterprise software system 19A an annotation management module 420 in database servers 40 determines that the data being saved back to enterprise software system 19A includes a new annotation. If annotation management module 420 determines that the data being saved back to enterprise software system 19A includes a new annotation, annotation management module 420 may determine whether a file is attached to the new annotation. If user 12A has attached a file to the new annotation, annotation management module 420 uploads the file. After uploading the file, annotation management module 420 may create an entry in attached file database 410. The entry in attached file database 410 may specify the globally unique identifier of the new annotation to which the uploaded file is attached. In addition, the entry in attached file database 410 may include a binary data block that represents the uploaded file. After annotation management module 420 creates the file in attached file database 410 or after annotation management module 420 determines that no file has been attached to the new annotation, annotation management module 420 may create an entry for the new annotation in one of annotation blocks 414.

If attached file database 410 already includes a copy of the file, annotation management module 420 may create a new entry in attached file database 410. This new entry includes a separate copy of the file in attached file database 410. Storing a separate copy of the file in attached file database 410 may allow users 12 to edit files attached to different annotations separately. In addition, storing separate copies of the file in attached file database 410 may allow annotation management module 420 to delete the file when one of users 12 deletes the annotation to which the file is attached.

As illustrated in the example of FIG. 24, database servers 40 may also include a file communication module 422. As described in detail below, file communication module 422 assists in the performance of links by identifying entries in attached file database 410 that are relevant to a link and by communicating the files in the identified entries to a counterpart file communication module in enterprise software system 19B. In addition, file communication module 422 may assist in the performance of links by receiving files from the counterpart file communication module in enterprise software system 19B and by creating entries in attached file database 410 for the received files.

Figure 25:
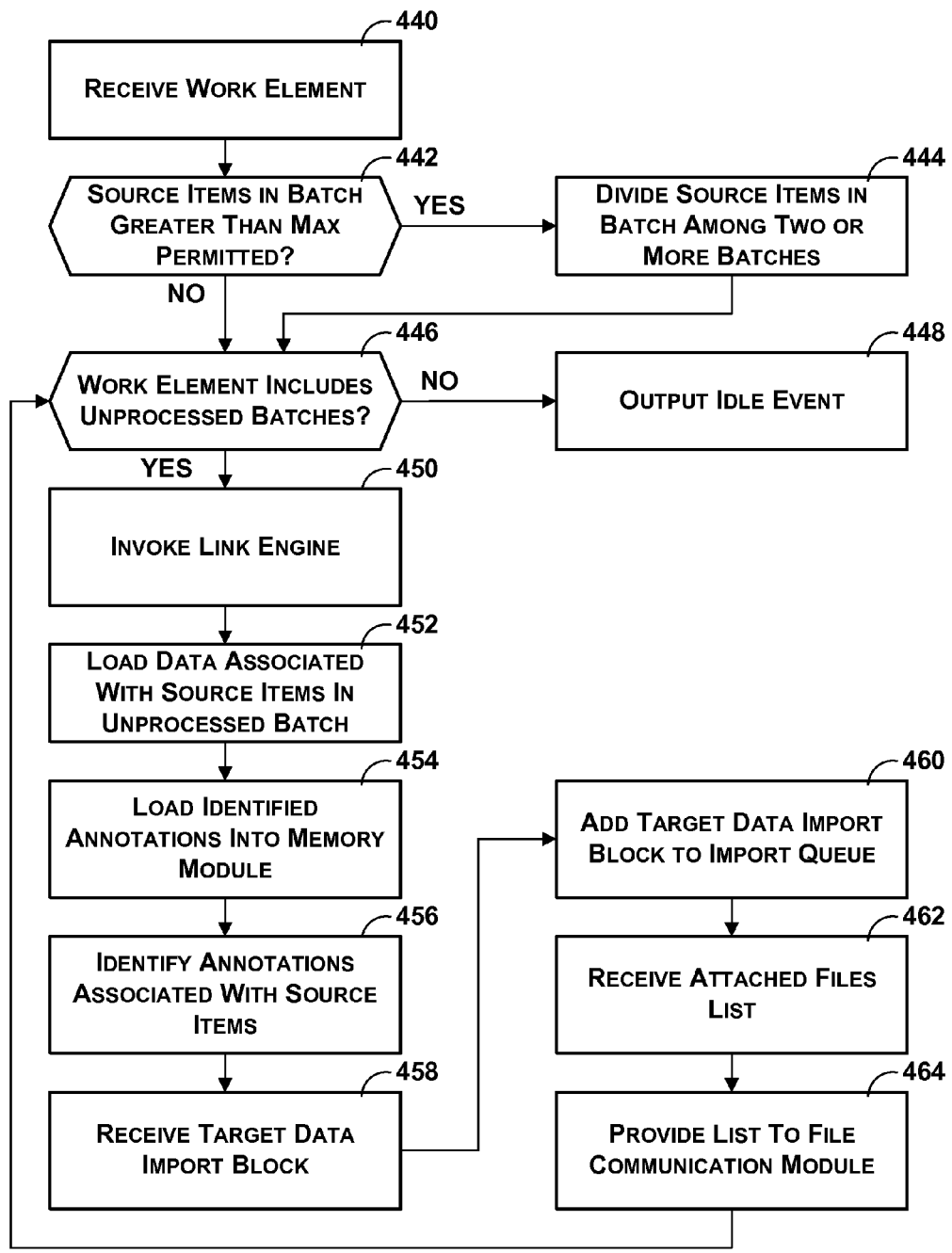
FIG. 25 is a flowchart illustrating an alternate exemplary operation of a job module when performing an administrative link.

FIG. 25 is a flowchart illustrating an alternate exemplary operation of a job module when performing an administrative link. When administrator 15, one of users 12, or an automated process instructs link control module 47 to invoke an administrative link in order to move multidimensional data from enterprise software system 19A to enterprise software system 19B, annotations associated with the multidimensional data are also automatically moved from enterprise software system 19A to enterprise software system 19B. In accordance with an administrative link, job modules 208 and link engines 205 (FIG. 16) may perform a first phase that moves data and annotations for the data from enterprise software system 19A to enterprise software system 19B. Job modules 208 may execute the exemplary operation illustrated in FIG. 25 in order to perform this first phase.

Initially, one of job modules 208 (e.g., job module 208A) may receive a work element from job allocation module 206 (440). When job module 208A receives the work element, all of the source items specified in the work element may be within a single "batch." For this reason, job module 208A may determine whether the number of source items in a batch of the received work element is greater than a maximum number of source items permitted in a single batch (442). If the number of source items in a batch in the work element is greater than the maximum number of source items permitted in a single batch ("YES" of 442), link control module 47 may divide the source items in this batch into two or more batches of source items (444).

After dividing the source items into batches or after determining that the number of source items specified by the work element is not greater than the maximum number of source items permitted in a single batch ("NO" of 442), job module 208A determines whether there are any unprocessed batches in the work element (446). If there are any unprocessed batches in the work element ("YES" of 446), job module 208A invokes link engine 205A (450).

When job module 208A invokes link engine 205A, link engine 205A loads all of the data blocks 412 associated with the source items of one of the unprocessed batches into a memory module of application server 26A (452). After link engine 205A loads the multidimensional data into the memory module of application server 26A, link engine 205A may load the one of annotation blocks 414 associated with the invoked link into the memory module of application server 26A (454). When link engine 205A loads the one of annotation blocks 414, link engine 205A may store in the memory module of application server 26A an annotation table for each of the data cubes in the data block. Next, link engine 205A may identify annotations associated with the source items of the unprocessed batch (456). Link engine 205A may identify annotations associated with source items of the unprocessed batch by scanning through annotation tables stored into the memory module of application server 26 for entries that specify cells of source items associated with the unprocessed batch.

After link engine 205A identifies the annotations, link engine 205A may generate, and job module 208A may receive, a target data import block (458). As part of the process of generating the target data import block, link engine 205A may generate a new set of globally unique annotation identifiers for annotations of cells or objects in the target model. Because a single source item may, for example, be mapped to multiple target items, annotations associated with cells of the source item may be replicated into cells of the target items. In this example, there may be more annotations in the target model than there were in the source model. For example, a single annotation associated with a single cell in the source model may be replicated into multiple annotations, each associated with one of a plurality of cells in the target model.

After link engine 205A finishes generating the target data import block, job module 208A may receive the target data import block from link engine 205A (458). After receiving the target data import block from link engine 205A, job module 208A may add the target data import block to import queue 64 (FIG. 3) (460). As described below with regard to FIG. 26, enterprise software system 19B may remove target data import blocks from import queue 64 and integrate data and annotations in the target data import blocks into target model 60.

In addition to receiving the target data import block from link engine 205A, job module 208A may receive an attached files list of entries from link engine 205A (462). Each entry in this list may specify an annotation identifier of one of the identified annotations to which a file has been attached. For purposes of convenience, this disclosure refers to an annotation identifier of an annotation of a cell or object in the source model as a "source annotation identifier." In addition, each entry in the attached files list specifies an annotation identifier of an annotation of a cell or object in the target model. For purposes of convenience, this disclosure refers to an annotation identifier of an annotation of a cell or object in the target model as a "target annotation identifier." Because a single cell in the source model may be, in effect, mapped to multiple cells the target model, a source annotation identifier may be associated with multiple entries in this list. However, in situations in which multiple cells in the source model are, in effect, mapped to a single cell in the target model, the attached files list maps source annotation identifiers to different annotation identifiers for different annotations for the single cell in the target model. Thus, the single cell in the target model may be associated with multiple annotations. Furthermore, for this reason, no two entries in the attached files list specify the same target annotation identifier.

When job module 208A receives the attached files list, job module 208A may provide the attached files list to file communication module 422 (464). For each entry in the attached files list, file communication module 422 may send to a counterpart file communication module in enterprise software system 19B an entry that specifies the target annotation identifier of the list entry and one or more files specified by an entry in attached file database 410 that specifies the source annotation identifier of the list entry.

After job module 208A provides the attached files list to file communication module 422, job module 208A may loop back and again determine whether the work element includes any unprocessed batches (446). If the work element does not include any unprocessed batches ("NO" of 446), job module 208A may output an idle event, thereby concluding the work element (448). The idle event may serve to alert job allocation module 206 that job module 208A is available to execute another work element.

Figure 26:
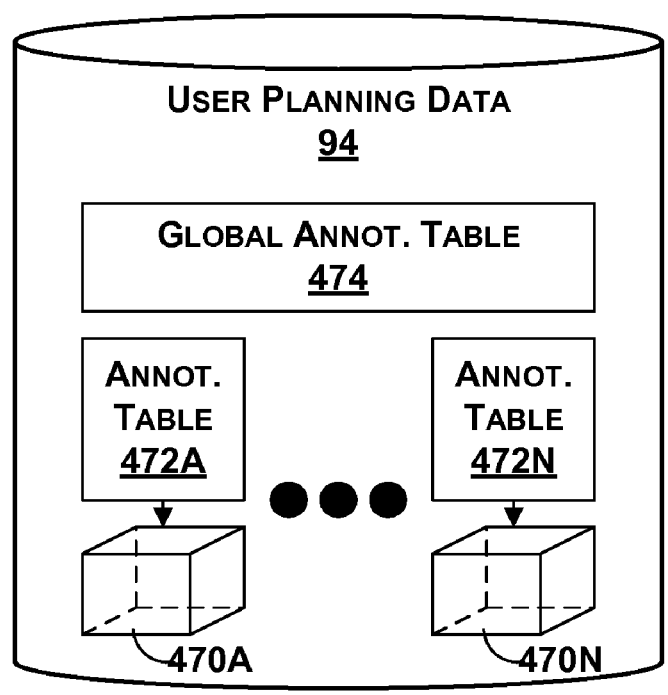
FIG. 26 is a block diagram illustrating an exemplary set of user planning data.

FIG. 26 is a block diagram illustrating an exemplary set of user planning data 94. As illustrated in the example of FIG. 26, user planning data 94 may include a set of data cubes 470A through 470N (collectively, "data cubes 470") that stores multidimensional data. Furthermore, each of data cubes 470 includes or otherwise is associated with one of annotation tables 472A through 472N (collectively, "annotation tables 472") ("ANNOT. TABLE"). Although illustrated in FIG. 26 as separate tables for the purpose of clarity, annotation tables 472 may be incorporated into respective ones of data cubes 470. For example, data cube 470A may include an "annotations" dimension that has cells that store annotations for other cells in data cube 470A.

Annotation tables 472 include entries that store annotations for individual cells in respective ones of data cubes 470. For instance, annotation table 472A may include an entry that stores an annotation for an individual cell of data cube 470A. Because there may be more than one annotation for a single cell, annotation tables 472 may include multiple entries for a single cell in data cube 470. For example, annotation table 472A may include a first entry that stores a first annotation for a cell of data cube 470A and may also include a second entry that stores a second annotation for the same cell of data cube 470A.

In addition to annotation tables 472, user planning data 94 may also include a global annotation table 474 ("GLOBAL ANNOT. TABLE"). Global annotation table 474 includes entries that store annotations for individual ones of data cubes 470, for a set of two or more of data cubes 470, for user planning data 94 as a whole, and/or for other object of enterprise data 40. Although illustrated in FIG. 26 as a separate table for purposes of clarity, global annotation table 474 may be incorporated into one or more of annotation tables 472 or into one or more of data cubes 470.

Figure 27:
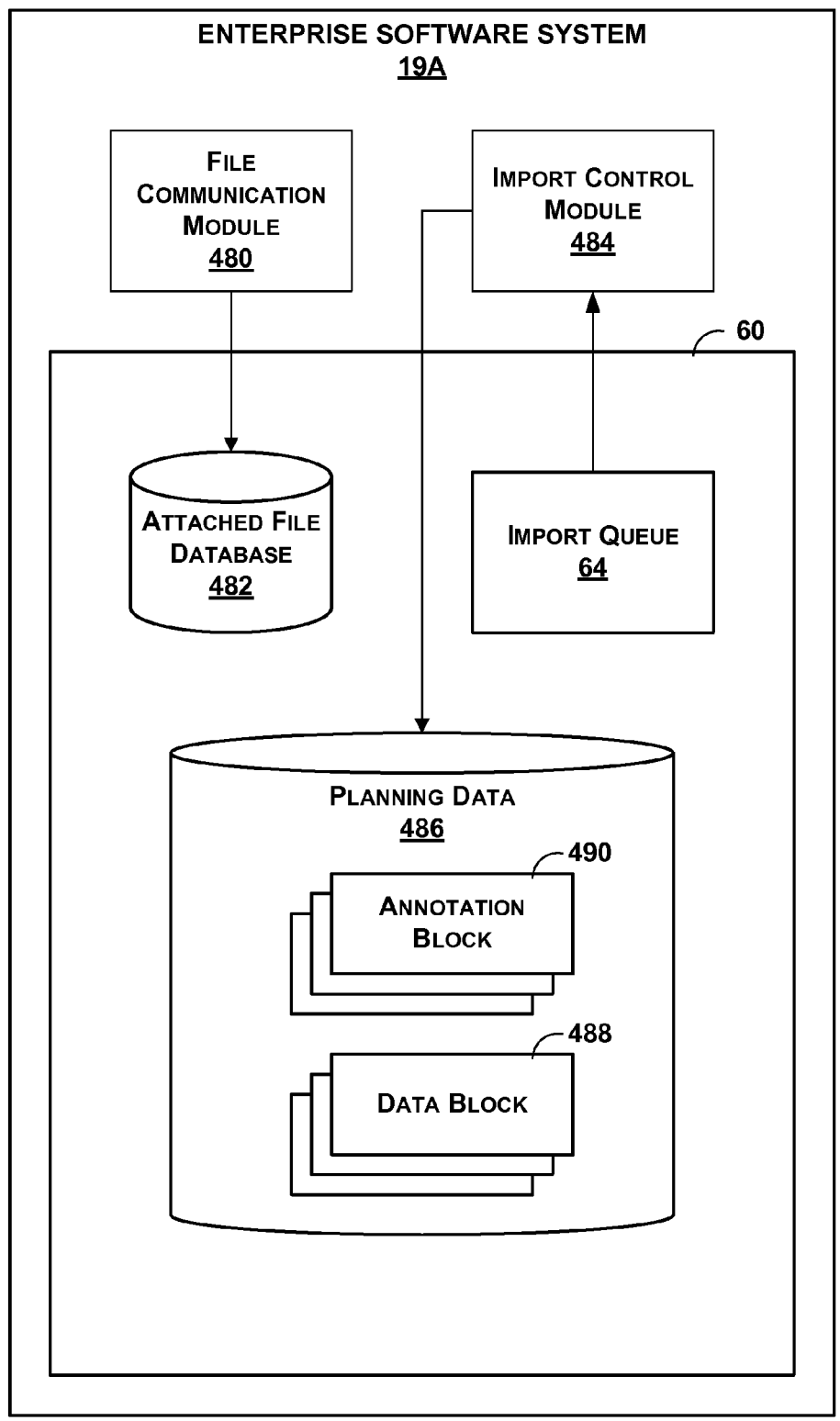
FIG. 27 is a block diagram illustrating exemplary details of a second enterprise software system.

FIG. 27 is a block diagram illustrating exemplary details of a target enterprise software system 19A. As illustrated in the example of FIG. 27, enterprise software system 19A may include a file communication module 480. File communication module 480 may receive from a counterpart file communication module in another enterprise software system (e.g., file communication module 422 of FIG. 24) entries that specify a target annotation identifier and a file. When file communication module 480 receives such an entry, file communication module 480 may add the entry to an attached file database 482 in target model 60 (FIG. 3).

Furthermore, as illustrated in the example of FIG. 27, enterprise software system 19A may include an import control module 484. Import control module 484 integrates data and annotations in target data import blocks into a set of planning data 486 in target model 60. Planning data 486, like planning data 42C, may include a set of data blocks 488A through 488N (collectively, "data blocks 488"). Data blocks 488 may or may not correspond directly or at all with data blocks 412 in planning data 42C. There will be one target data import block present in the import queue of the target application for each node targeted by the link. Planning data 486 may also include annotation blocks 490A through 490N (collectively, "annotation blocks 490"). Each one of annotation blocks 490 is associated with one of data blocks 488. For instance, annotation blocks 490 may include data that indicate an associated one of data blocks 488. Alternatively, annotation blocks 490 may be incorporated directly in associated ones of data blocks 488. Annotation blocks 490 may store entries that specify annotations for cells in associated ones of data blocks 488. In addition, annotation blocks 490 may store entries that specify annotations for objects (e.g., data cubes in data blocks 488, target model 60, or other objects).

In order to integrate data and annotations in a target data import block into planning data 486, import control module 484 may, for example, determine whether import queue 64 contains a target data import block. If import queue 64 contains a target data import block, import control module 484 may remove the target data import block from import queue 64. After removing the target data import block from import queue 64, import control module 484 may identify appropriate cells of data cubes in data blocks 488 for the data in the target data import block. Import control module 484 may then insert the data in the target data import block into appropriate ones of the identified cells of data cubes 488.

In addition, import module 484 may automatically create entries in annotation blocks 490 for annotations specified in the target data import block. The target data import block may include an entry for each annotation that import control module 484 is to incorporate into annotation blocks 490. Such entries in the target data import block specify the annotation identifiers to use with the entries in annotation blocks 490. By creating entries in annotation blocks 490 that specify the annotation identifiers specified for the annotation in the target data import block, entries in attached file database 482 indicate the correct entries in annotation tables 490 and global annotation table 492. Import control module 484 may then persist (i.e., store in a persistent storage medium) the data in data blocks 488 and store the annotations in annotation blocks 490.

Figure 28:
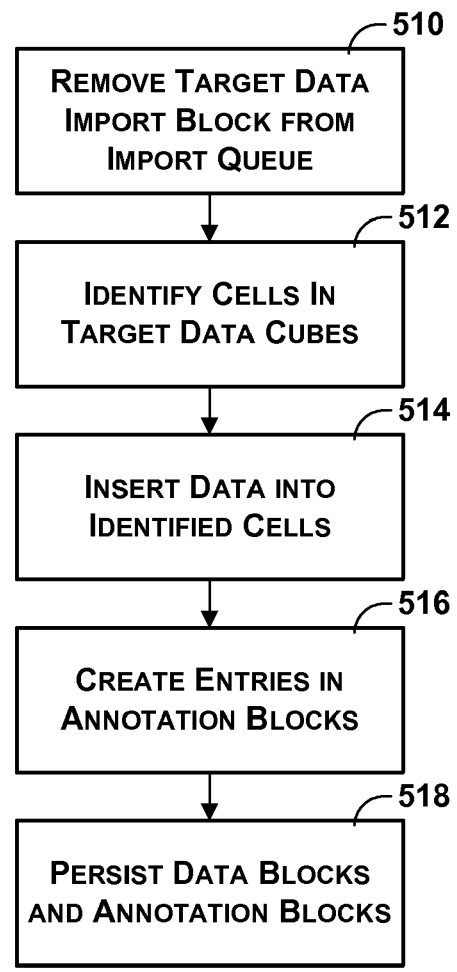
FIG. 28 is a flowchart illustrating an exemplary operation of an import control module.

FIG. 28 is a flowchart illustrating an exemplary operation of import control module 484. Import control module 484 may use the exemplary operation of FIG. 28 to integrate data in a target data import block into target model 60. Import control module 484 may begin this exemplary operation by removing a target data import block from import queue 64 (510). After removing the target data import block from import queue 64, import control module 484 may identify appropriate cells in data cubes of one or more data blocks 488 in which to store the data of the target data import block (512). Next, import control module 484 may insert the data of the target data import block into appropriate ones of the identified cells of data cubes of data blocks 488 (514).

After inserting the data of the target data import block into appropriate ones of the identified cells of data cubes of data blocks 488, import control module 484 may create entries in appropriate ones of annotation blocks 490 for each annotation specified in the target data import block (516). Next, import control module 484 may persist the updated ones of data blocks 488 and annotation blocks 490.

Figure 29:
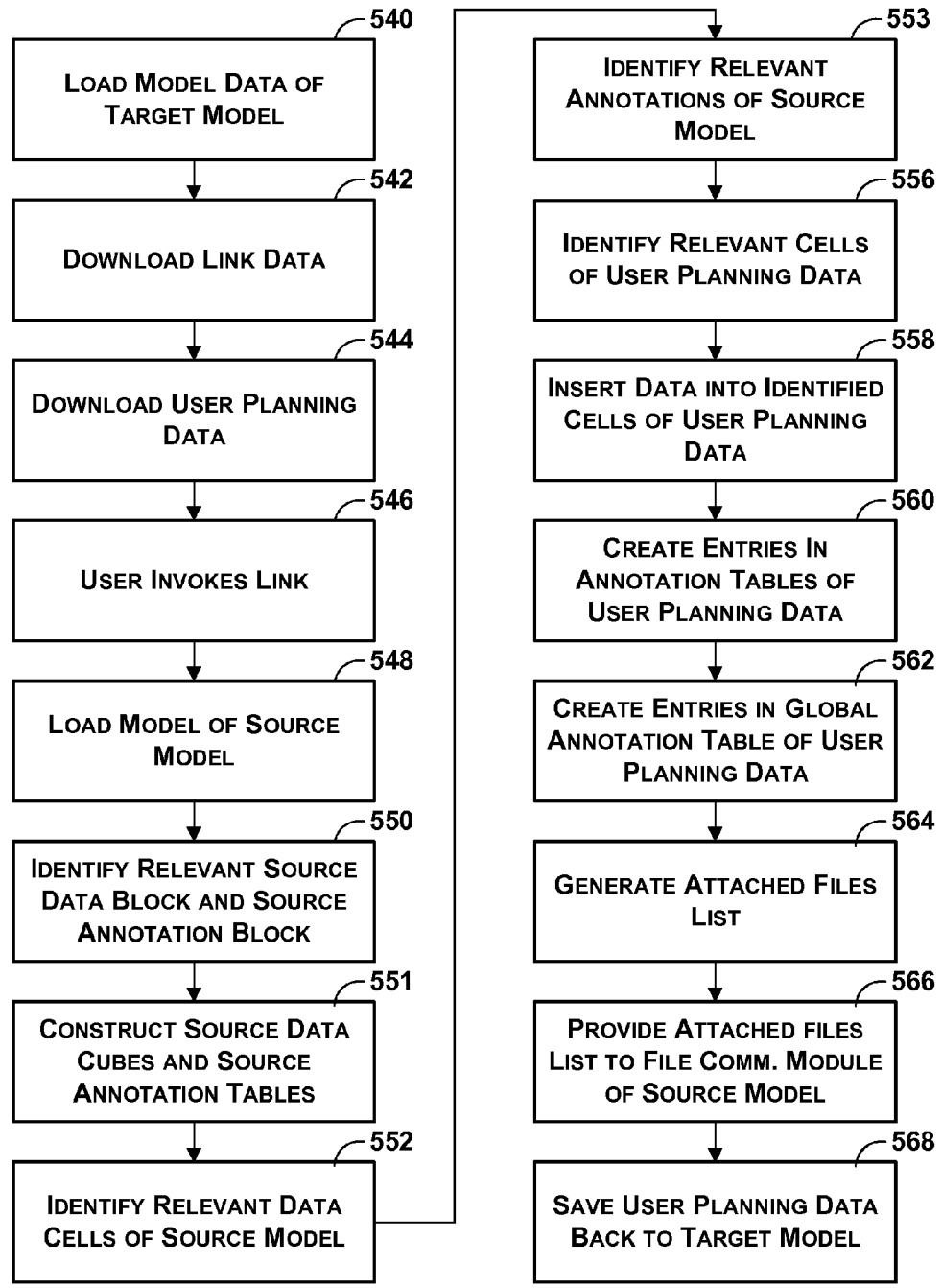
FIG. 29 is a flowchart illustrating an exemplary operation of an application layer of a client device when performing a user link.

FIG. 29 is a flowchart illustrating an exemplary operation of application layer 92 of computing device 16A when performing a user link. As described above with regard to FIG. 5, a user link moves node-specific multidimensional data from one data cube to another data cube. Each one of users 12 may invoke a user link to initiate movement of multidimensional data 17 that is specific to a node of the enterprise model to which the user has access.

In accordance with the example operation illustrated in FIG. 29, application layer 92 initially loads model data 42B in enterprise data 40 of enterprise software system 19A (540). In the example of FIG. 29, this disclosure refers to enterprise data 40 as the "target model" because data from the model in enterprise software system 19B is integrated into enterprise data 40. After loading model data 42B, application layer 92 may download link data 42D from enterprise software system 19A (542). Next, application layer 92 may use the downloaded model data of enterprise data 40 to download user planning data (544). User planning data may be the subset of planning data 44C associated with a node of the organizational model with which user 12A is associated, including annotations from annotation blocks 414. Application layer 92 may store annotations of user planning data 94 in annotation tables 472 (FIG. 26) within the user planning data and in global annotation table 474 within the user planning data.

After application layer 92 downloads user planning data 94, user 12A may invoke a link specified by the downloaded link data (546). When user 12A invokes the link, application layer 92 may load the model data of the model in enterprise software system 19B (548). In the example of FIG. 29, this disclosure refers to the model in enterprise software system 19B as the "source model" because data from the model in enterprise software system 19B is integrated into enterprise data 40 in enterprise software system 19A.

Next, application layer 92 may use the downloaded model data of the source model to identify a relevant one of data blocks 488 and a relevant one of annotation blocks 490 (550). The relevant one of data blocks 488 contains those cells that are associated with the source item of the invoked link. The relevant one of annotation blocks 488 contains annotations associated with the relevant one of data blocks 488. After downloading the relevant one of data blocks 488 and the relevant one of data blocks 488, application layer 92 may construct data cubes and annotation tables for the relevant one of data blocks 488 and the relevant one of annotation blocks 490 (551). These data cubes and annotation tables may resemble those shown in the example of FIG. 26. Next, application layer 92 may identify relevant data cells in the source model (552). The relevant cells are those cells associated with the source item of the invoked link. Application layer 92 may then identify annotations in the annotation tables of the source model (553). The relevant annotations are those annotations in annotation tables of the source model that are associated with the identified cells in data cubes of the source model.

Application layer 92 may then identify the relevant cells of the user planning data (556). The relevant cells of the user planning data are those cells in the user planning data that are associated with the target items of the invoked link. Application layer 92 may then insert the data of the identified cells into appropriate ones of the identified cells of data blocks 470 in user planning data 94 (558). Next, application layer 92 may create entries in appropriate annotation tables 472 of user planning data 94 for the identified annotations (560). Application layer 92 may then create one or more entries in global annotation table 474 of user planning data 94 for ones of the retrieved annotations at the object-level (562).

When application layer 92 has finished creating entries in global annotation table 474, application layer 92 generates an attached files list (564). The attached files list includes a set of entries. Each of these entries specifies a source annotation identifier for one of the retrieved annotations and specifies a target annotation for one of the new annotations in the annotation tables and global annotation table of the user planning data. After generating the attached files list, application layer 92 provides the attached files list to file communication module 480 in enterprise software system 19B (566). When file communication module 480 receives the attached files list, file communication module 480 may, for each entry in the attached files list, send to file communication module 422 in enterprise software system 19A an entry that specifies the target annotation identifier of the list entry and one or more files specified by an entry in attached file database 482 that specifies the source annotation identifier of the list entry.

After application layer 92 has provided the attached files list to file communication module 480 as part of the link execution, user 12A may save user planning data 94 of his or her slice of the target model (including the data and annotations linked from the source model) (568).

Various embodiments of the invention have been described. Although described in reference to an enterprise planning system, such as an enterprise financial or budget planning system, the techniques may be readily applied to other software systems, including other large-scale enterprise software systems. Examples of other enterprise software systems include order management systems, inventory management systems, sales force management systems, business intelligence tools, enterprise reporting tools, project and resource management systems and other enterprise software systems. Moreover, the techniques may be implemented on any type of computing device, including servers, client computers, laptops or other devices. These and other embodiments are within the scope of the following claims.

The invention claimed is:

1. A method for exporting data from a first enterprise software system comprising:
    defining a link from the first enterprise software system to a second enterprise software system, wherein the link specifies a source area of a first multidimensional database and a target area of a second multidimensional database, wherein the link defines one or more of mappings each specifying a relationship between one or more cells of the source area and one or more cells of the target area, wherein the first enterprise software system accesses the first multidimensional database, wherein the second enterprise software system accesses the second multidimensional database, and wherein the first and second multidimensional databases each include three or more dimensions;
    automatically copying multidimensional data from the source area of the first multidimensional database to the target area of the second multidimensional database in accordance with the link;
    identifying one or more annotations associated with the multidimensional data of the source area, wherein each of the annotations defines at least text-based commentary associated with a portion of the multidimensional data of the source area; and
    automatically copying the identified one or more annotations associated with the multidimensional data of the source area from the source area to the target area in accordance with the link, wherein automatically copying includes:

if the link defines a first mapping of the plurality of mappings from one cell of the source area to a plurality of cells of the one or more cells of the target area and at least one of the one or more annotations is associated with the one cell of the source area, replicating the at least one annotation associated with the one cell of the source area into multiple annotations, and associating each of the multiple annotations with a respective cell of the plurality of cells of the target area and if the link defines a second mapping of the plurality of mappings from a plurality of cells of the one or more cells of the source area to one cell of the target area and each of at least two of the one or more annotations are associated with a respective cell of the plurality of cells of the source area, associating the at least two annotations with the one cell of the target area.

2. The method of claim 1, wherein defining a link comprises:
identifying a source data cube and a target data cube;
identifying a source dimension of the source data cube and a target dimension of the target data cube; and
defining a mapping between items of the source dimension and items of the target dimension,
wherein automatically copying multidimensional data includes copying the multidimensional data in accordance with the mapping.

3. The method of claim 1, wherein defining a link comprises defining a data aggregation that maps a plurality of items along a source dimension to one item along a target dimension.

4. The method of claim 1, wherein defining a link comprises mapping one or more items along a source dimension to one or more items along a target dimension.

5. The method of claim 1, wherein automatically copying the identified one or more annotations associated with the multidimensional data of the source area comprises:
identifying a plurality of target cells in the target area associated with the cells of the multidimensional data in accordance with the link; and
creating annotations associated with cells in the plurality of target cells based on the at least one of the annotations associated with the individual cell of the multidimensional data of the source area.

6. The method of claim 1,
wherein the method further comprises automatically copying files attached to the annotations from the first enterprise software system to the second enterprise software system in accordance with the link, and
wherein, after copying the files, the files of the second enterprise software system are correctly associated with corresponding annotations within the target area.

7. The method of claim 1, wherein the annotations are incorporated into the multidimensional data as an additional dimension of the multidimensional data.

8. The method of claim 1, further comprising:
downloading multidimensional planning data to a client device of a user;
automatically copying the multidimensional data from the source area to the planning data upon manual invocation of the link by the user; and
saving the planning data to the target area from the client device.

9. The method of claim 1, wherein automatically copying multidimensional data comprises copying the multidimensional data from a live source area storing current multidimensional data for the first enterprise software system to a live target area storing current multidimensional data associated with the second enterprise software system.

10. The method of claim 1, wherein automatically copying multidimensional data comprises exporting a consistent set of data from the source area.

11. The method of claim 1,
wherein the at least one of the annotations associated with the individual cell of the multidimensional data of the source area specifies user-readable information regarding data within the individual cell within the multidimensional data of the source area.

12. The method of claim 1,
wherein one of the annotations is associated with a data cube of the multidimensional data; and
wherein the one of the annotations specifies user-readable information regarding the data cube.

13. A system comprising:
a programmable processor;
a first database storing multidimensional data accessible at least by a first enterprise software system, wherein the multidimensional data of the first database includes three or more dimensions;
a second database storing multidimensional data accessible at least by a second enterprise software system, wherein the multidimensional data of the second database includes three or more dimensions;
an interface to receive input that defines a link specifying a source area of the first database and a target area of the second database, wherein the link defines one or more mappings each specifying a relationship between one or more cells of the source area and one or more cells of the target area; and
a link control module executable by the programmable processor to:
automatically copy multidimensional data from the source area to the target area in accordance with the link;
identify one or more annotations associated with the multidimensional data of the source area, wherein each of the annotations defines at least text-based commentary associated with a portion of the multidimensional data of the source area; and
automatically copy the identified one or more annotations associated with the multidimensional data of the source area from the source area to the target area in accordance with the link, wherein automatically copying includes:
if the link defines a first mapping of the plurality of mappings from one cell of the source area to a plurality of cells of the one or more cells of the target area and at least one of the one or more annotations is associated with the one cell of the source area, replicating the at least one annotation associated with the one cell of the source area into multiple annotations, and associating each of the multiple annotations with a respective cell of the plurality of cells of the target area and
if the link defines a second mapping of the plurality of mappings from a plurality of cells of the one or more cells of the source area to one cell of the target area and each of at least two of the one or more annotations are associated with a respective cell of the plurality of cells of the source area, associating the at least two annotations with the one cell of the target area.

14. The system of claim 13,
wherein the interface includes input areas by which an administrator defines the link by specifying a source data cube of the source database, a target data cube of the target database, a source dimension of the source data cube and a target dimension of the target data cube,
wherein the interface includes input areas by which the administrator defines a mapping between items of the source dimension and items of the target dimension, and
wherein the link control module automatically copies the multidimensional data in accordance with the mapping.

15. The system of claim 13,
wherein the interface includes input areas by which an administrator defines a data aggregation that maps a plurality of items along a source dimension to one item along a target dimension, and
wherein the link control module automatically aggregates at least a portion of the multidimensional data when copying the multidimensional data from the source area to the target area.

16. The system of claim 13, wherein the interface includes input areas by which an administrator maps one or more items along a source dimension of the first database to one or more items along a target dimension of the second database.

17. The system of claim 13, wherein, in order to copy the identified one or more annotations associated with the multidimensional data of the source area, the link control identifies a plurality of target cells in the target area associated with the cells of the multidimensional data in accordance with the link, and creates annotations associated with cells in the plurality of target cells based on the at least one of the annotations associated with the individual cell of the multidimensional data of the source area.

18. The system of claim 13, wherein the link control module copies files attached to the annotations from the first enterprise software system to the second enterprise software system in accordance with the link, and wherein, after copying the files, the files of the second enterprise software system are correctly associated with corresponding annotations within the target area.

19. The system of claim 13, wherein the annotations are incorporated into the multidimensional data as an additional dimension of the multidimensional data.

20. The system of claim 13, further comprising:
a client device providing an operating environment for a planning software application,
wherein the planning software application downloads node-specific planning data from the second database to the client device, automatically retrieves the multidimensional data from the source area of the first database upon manual invocation of the link by a user, and saves the node-specific planning data and the multidimensional data to the target area from the client device.

21. The system of claim 13,
wherein the source area comprises a live source area that stores current multidimensional data for the first enterprise software system, and
wherein the target area comprises a live target area that stores current multidimensional data for the second enterprise software system.

22. The system of claim 13,
wherein the one or more annotations associated with the multidimensional data of the source area comprises a first one of the annotations and a second one of the annotations,
wherein the at least one of the annotations associated with the individual cell of the multidimensional data of the source area comprises the first one of the annotations,
wherein the first one of the annotations specifies user-readable information regarding data within the individual cell within the multidimensional data of the source area,
wherein the second one of the annotations is associated with a data cube of the multidimensional data of the source area, and
wherein the second one of the annotations specifies user-readable information regarding the data cube.

23. A computer-readable hardware storage medium comprising instructions that cause one or more programmable processors of a computing device to:
present a user interface to receive input specifying a link defining:
a source data cube of a first enterprise software system, the source data cube including three or more dimensions,
a source dimension of the source data cube,
a target data cube of a second enterprise software system, the target data cube including three or more dimensions,
a target dimension of the target data cube, and
one or more mappings each specifying a relationship between one or more cells of the source data cube and one or more cells of the target data cube;
automatically copy multidimensional data associated with the source item of the source data cube to the target items of the target data cube;
identify one or more annotations associated with the multidimensional data of the source data cube, wherein each of the annotations defines at least one text-based commentary associated with a portion of the multidimensional data of the source data cube; and
automatically copy the identified one or more annotations associated with the multidimensional data of the source data cube from the source data cube to the target data cube in accordance with the link, wherein automatically copying includes:
if the link defines a first mapping of the plurality of mappings from one cell of the source data cube to a plurality of cells of the one or more cells of the target data cube and at least one of the one or more annotations is associated with the one cell of the source data cube, replicating the at least one annotation associated with the one cell of the source data cute into multiple annotations, and associating each of the multiple annotations with a respective cell of the plurality of cells of the target data cube; and
if the link defines a second mapping of the plurality of mappings from a plurality of cells of the source data cube to one cell of the target data cube and each of at least two of the one or more annotations are associated with a respective cell of the plurality of cells of the source data cube, associating the at least two annotations with the one cell of the target data cube.

24. The computer-readable storage medium of claim 23, further comprising instructions to automatically copy files attached to the annotations from the first enterprise software system to the second enterprise software system in accordance with the link, wherein, after copying the files, the files of the second enterprise software system are correctly associated with corresponding annotations within the target area.

* * * * *